(12) United States Patent
Nakazawa et al.

(10) Patent No.: US 7,130,460 B2
(45) Date of Patent: Oct. 31, 2006

(54) MEDICAL-USE IMAGE RECORDING APPARATUS AND MEDICAL-USE IMAGING SYSTEM

(75) Inventors: Masayuki Nakazawa, Hachioji (JP); Akira Yamano, Hachioji (JP)

(73) Assignee: Konica Corporation (JP)

( * ) Notice: Subject to any disclaimer, the term of this patent is extended or adjusted under 35 U.S.C. 154(b) by 729 days.

(21) Appl. No.: 10/300,419

(22) Filed: Nov. 19, 2002

(65) Prior Publication Data

US 2003/0103661 A1 Jun. 5, 2003

(30) Foreign Application Priority Data

Nov. 26, 2001 (JP) ............................. 2001-359498

(51) Int. Cl.
*G06K 9/00* (2006.01)
(52) U.S. Cl. ................. 382/128; 382/255; 358/502
(58) Field of Classification Search ................ 382/128, 382/129, 130, 131, 132, 133, 162, 168, 169, 382/172, 194, 209, 254, 260, 274, 305, 189, 382/255, 275; 358/502; 600/437; 378/63, 378/158; 345/589
See application file for complete search history.

(56) References Cited

U.S. PATENT DOCUMENTS

| | | | | |
|---|---|---|---|---|
| 4,497,062 A | * | 1/1985 | Mistretta et al. | ............ 378/158 |
| 6,406,428 B1 | * | 6/2002 | Mittelstaedt | ................ 600/437 |
| 6,424,730 B1 | * | 7/2002 | Wang et al. | ................ 382/128 |
| 6,504,897 B1 | * | 1/2003 | Yonekawa | .................... 378/63 |
| 6,674,444 B1 | * | 1/2004 | Tahara | ......................... 345/589 |
| 6,771,814 B1 | * | 8/2004 | Nakajima | ................... 382/168 |

* cited by examiner

*Primary Examiner*—Jingge Wu
*Assistant Examiner*—Seyed Azarian
(74) *Attorney, Agent, or Firm*—Squire, Sanders & Dempsey L.L.P.

(57) ABSTRACT

An image recording method for visualizing an image signal of medical diagnosis, which has the steps of: inputting the image signal of medical diagnosis; processing the image signal of medical diagnosis to get correct sharpness in visualized image by applying a frequency enhancement processing; and visualizing the image signal of medical diagnosis by conducting an ink-jetting process to form an image on a recording medium based on a processed image signal, wherein the ink-jetting process has a characteristic such that sharpness of a visualized image varies in relation with a density of the visualized image; wherein degree of enhancement in the frequency enhancement processing is determined according to a density of visualized image.

18 Claims, 9 Drawing Sheets

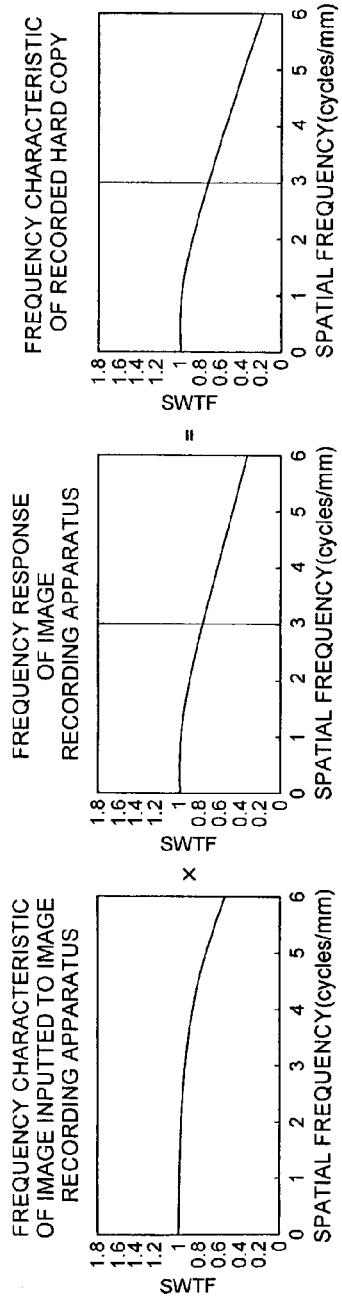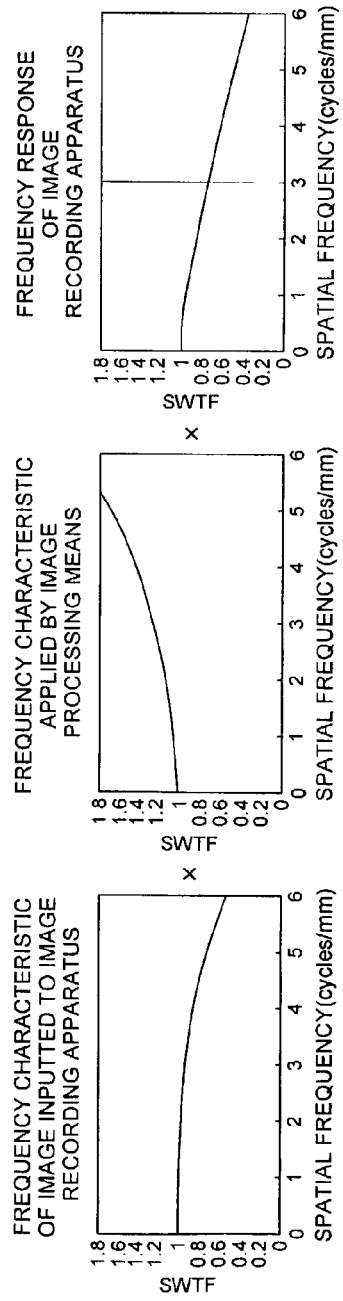

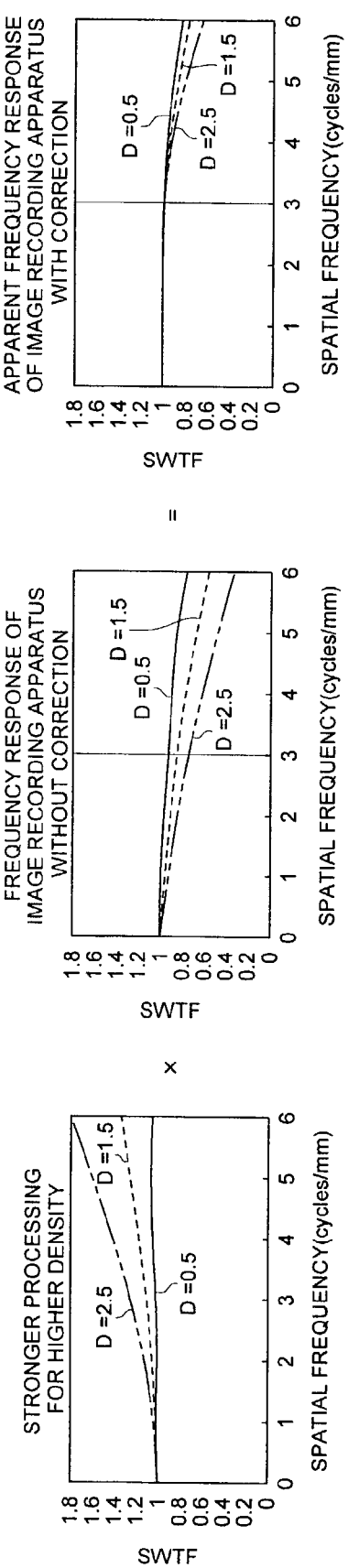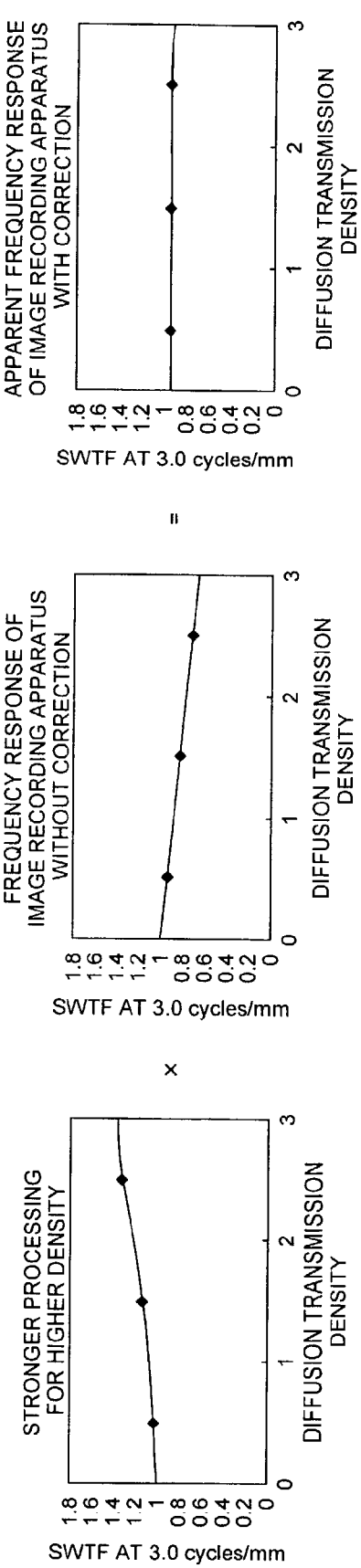

RELATION BETWEEN ENHANCEMENT
COEFFICIENT AND IMAGE DATA

RELATION BETWEEN ENHANCEMENT
COEFFICIENT AND IMAGE DATA

FIG. 7 (a1) BEFORE PROCESSING
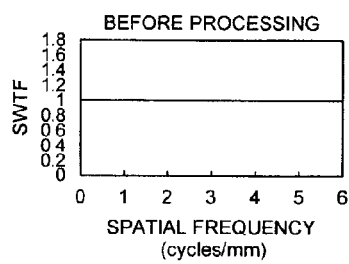

FIG. 7 (a2) IMAGE RECORDING APPARATUS A
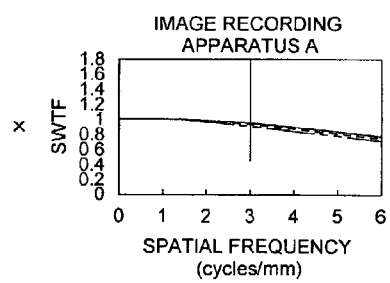

FIG. 7 (a3)
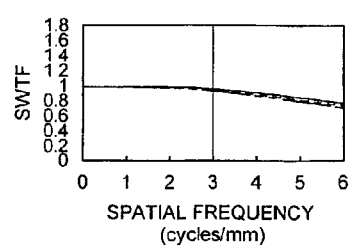

FIG. 7 (b1) CONSTANT PROCESSING THROUGH DENSITIES
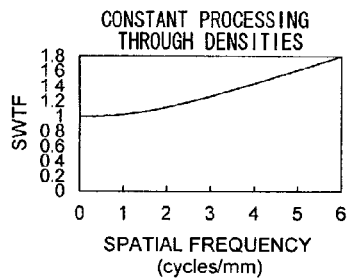

FIG. 7 (b2) IMAGE RECORDING APPARATUS B
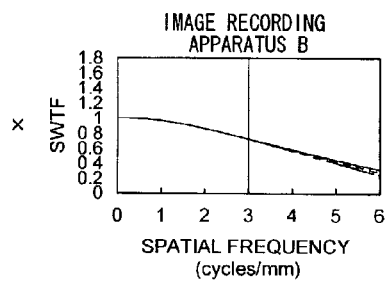

FIG. 7 (b3)
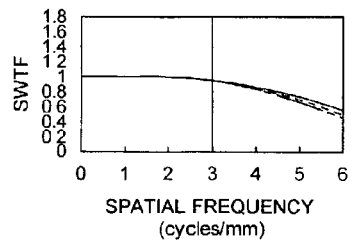

FIG. 7 (c1) STRONGER PROCESSING FOR HIGHER DENSITY
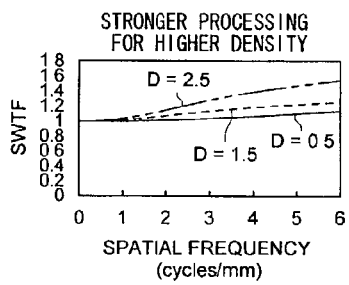

FIG. 7 (c2) IMAGE RECORDING APPARATUS C
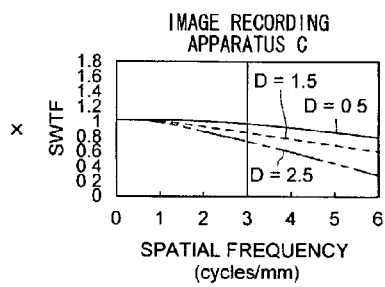

FIG. 7 (c3)
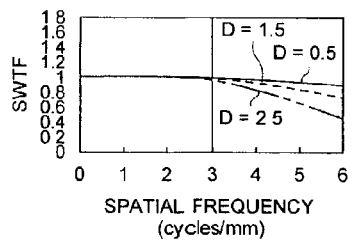

FIG. 7 (d1) STRONGER PROCESSING FOR LOWER DENSITY
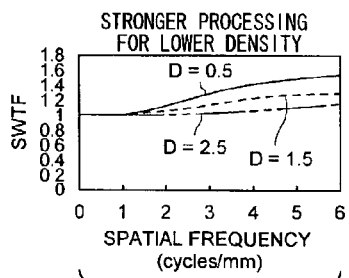

FIG. 7 (d2) IMAGE DISPLAY APPARATUS D
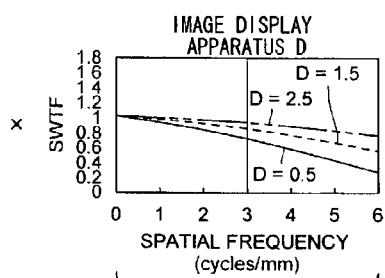

FIG. 7 (d3)
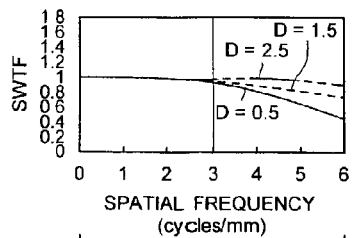

CHARACTERISTICS OF IMAGE PROCESSING APPARATUS

CHARACTERISTICS OF EACH RECORDING (DISPLAY) APPARATUS WITHOUT CORRECTION

CHARACTERISTICS OF EACH RECORDING (DISPLAY) APPARATUS WITH CORRECTION

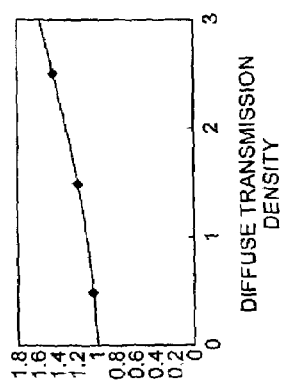
FIG. 10(f)
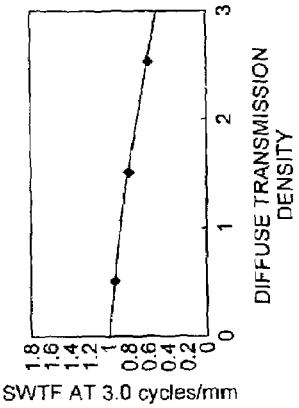
FIG. 10(e)
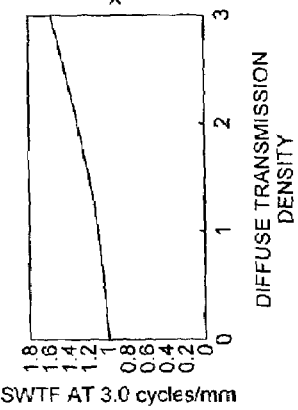
FIG. 10(d)
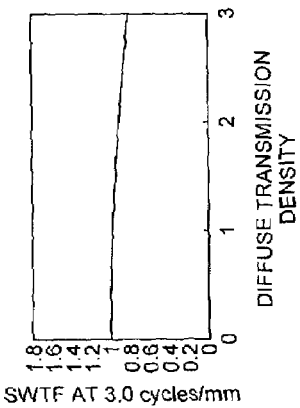
FIG. 10(c)
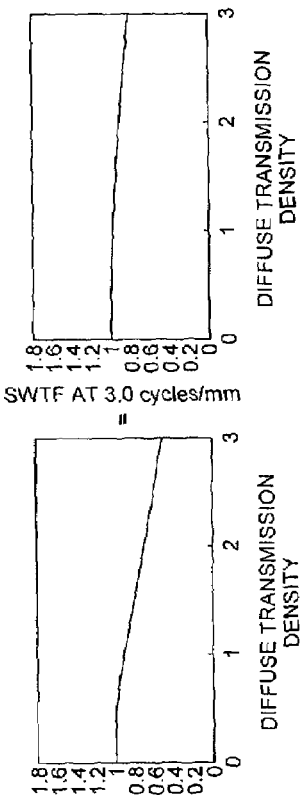
FIG. 10(b)
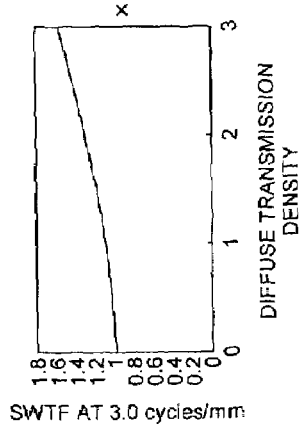
FIG. 10(a-1)
FIG. 10(a-2)

MEDICAL-USE IMAGE RECORDING APPARATUS AND MEDICAL-USE IMAGING SYSTEM

BACKGROUND OF THE INVENTION

This invention relates to an image recording apparatus and an apparatus for recording an image for medical use (hereinafter referred to as a medical-use image recording apparatus for simplicity's sake), which carry out recording on a recording medium or display on the basis of image information, as well as a system for an image for medical use carrying out the processing of an image (hereinafter referred to as a medical-use imaging system for simplicity's sake), and in particular, to an image recording apparatus and a medical-use image recording apparatus as well as a medical-use imaging system which practice the ink jet recording of image information for medical use obtained by an input apparatus such as a medical-use image radiographing apparatus.

In recent years, it has been put into practice to devise a method for obtaining the information of a medical-use radiation image without the use of a radiographic film composed of silver halide photosensitive material. For example, it has broadly been spreading a radiation image reading apparatus which uses an imaging plate mainly composed of a stimulable phosphor, once stores a radiation image, and after that, takes out the image as stimulated emission of light by the use of an excitation light, to obtain an image signal by the photoelectric conversion of the stimulated emission of light (an apparatus of Computed Radiography hereinafter abbreviated as CR).

Further, lately, also it has been proposed an apparatus for reading radiation image information by the combination of a radiation phosphor or a radiation photoconductor with a two-dimensional semiconductor detector such as a TFT switching device (a Flat Panel Detector hereinafter abbreviated as an FPD).

Further, also it has been spreading a radiation image input apparatus other than a simple X-ray radiographing apparatus such as an X-ray computed tomography apparatus (X-ray CT apparatus) and a magnetic resonance imaging apparatus (an MRI apparatus). These medical-use image input apparatus provide image information in a form of a digital signal in most cases.

In diagnosing these images for medical use, it is mostly used a method in which image information is recorded on a transmission recording medium and/or reflection recording medium and observed in a form of a hard copy. For a medical-use image recording apparatus which records medical-use image information on a recording medium, it is often used an apparatus employing a method in which an image is recorded by exposing a transmission recording medium using a silver halide recording material to a laser beam. By this method, a monochromatic image having multiple gray scales can be depicted with an excellent gradation characteristic, and on top of it, a high diagnosis capability can be exhibited by the observation of the image recorded on a transmission medium using a transmission light.

Besides, lately, expectation is placed on the possibility of recording a medical-use image by means of a recording apparatus of an ink jet type.

It is desirable that the above-mentioned medical-use image recording apparatus expresses image information obtained by a radiation image input apparatus with a fidelity as high as possible, but actually, an image blur peculiar to the recording apparatus is produced.

For example, in a method in which an image is recorded by a laser beam exposure, an image blur resulting from the laser beam having a diameter of a certain size is produced. Further, in what is called a thermal recording method, in which an image is recorded by the application of heat to each of the pixels of the recording medium, an image blur resulting from the thermal head having a finite size and the heat spreading is produced. Further, also in an ink jet method, an image blur due to it that the coloring agent in the ink runs to spread inside the recording medium or on the surface.

Further, also in a display monitor such as a CRT or a liquid crystal display, an image blur is produced. Such an image blur brings about the lowering of diagnosis capability, and possibly it results in a diagnosis error.

As regards the above-mentioned image blur, its degree becomes different with the change of the medical-use image recording apparatus; further, in some cases, even in the one and same medical-use image recording apparatus, the degree of image blur becomes different in accordance with the density of an image to be recorded, which prevents the diagnosis from being performed on the basis of a stable image quality.

In order to make these kinds of image blur small, in a laser exposure method for example, it is appropriate to make the diameter of the laser beam smaller; however, there has been a problem that the optical system became of high cost and unevenness in recording occurred which lowered the image quality on the contrary. Further, also in an ink jet method, in order to make the diameter of ink dots smaller, it is appropriate to make smaller the ink drops to be jetted; however, the technology for making it is difficult, and also there has been a problem that, with the liquid drops being made smaller, the recording speed became lowered.

Further, in recording an image by an ink jet method, in some cases ink deposition amount onto a recording medium becomes different in accordance with the density of an image to be recorded. Depending on the ink deposition amount on the recording medium, mobility of the dye material in the recording medium becomes different, and owing to it, the degree of spreading, that is, the sharpness characteristic becomes different. Hence, there has been a problem that the sharpness characteristic became different in accordance with the density of an image to be recorded which made it impossible to obtain a stable image quality.

This invention has been made in view of the above-mentioned points of problem, and its object is to provide an image recording apparatus and a medical-use image recording apparatus which are capable of recording an image having no image blur and a high diagnosis capability in a simple method.

Further, it is another object of this invention to actualize a medical-use imaging system which is not influenced by the change of the density of an image to be recorded, and the change of the image recording apparatus and/or image display apparatus, and is capable of providing an image having a stable image quality.

SUMMARY OF THE INVENTION

That is, this invention for solving the above-mentioned problems are such ones as described in the following.

(1) An image recording method for visualizing an image signal of medical diagnosis, comprising: inputting the image signal of medical diagnosis; processing the image signal of medical diagnosis to get correct sharpness in visualized image by applying a frequency enhancement processing;

and visualizing the image signal of medical diagnosis by conducting an ink-jetting process to form an image on a recording medium based on a processed image signal, wherein the ink-jetting process has a characteristic such that sharpness of a visualized image varies in relation with a density of the visualized image; wherein degree of enhancement in the frequency enhancement processing is determined according to a density of visualized image.

(2) The image recording method of (1), wherein the degree of enhancement in the frequency enhancement processing is higher with the image density of the visualized image becoming higher.

(3) The image recording method of (1), wherein degree of enhancement in the frequency enhancement processing is changed in accordance with the image density of the visualized image, and with a kind of the recording medium.

(4) The image recording method of (1), wherein the frequency enhancement processing is applied in accordance with the image density of the visualized image, and with a kind of the ink.

(5) The image recording method of (1), wherein the frequency enhancement processing is applied in accordance with the image density of the visualized image, with a kind of a recording medium, and with a kind of the ink.

(6) An image recording apparatus for visualizing an image signal of medical diagnosis, comprising: an image signal input device for inputting the image signal of medical diagnosis; an image processing device for applying a frequency enhancement processing to an inputted image signal of medical diagnosis to get corrected sharpness in visualized image; a recording device for visualizing the image signal of medical diagnosis by jetting ink onto a recording medium based on a processed image signal, wherein the recording device has a characteristic such that sharpness of a visualized image varies in relation with a density of the visualized image; and a controller for controlling degree of enhancement in frequency enhancement processing according to a density of visualized image.

(7) The image recording apparatus of (6), wherein the degree of enhancement in the frequency enhancement processing is higher with the image density of the visualized image becoming higher.

(8) The image recording apparatus of (6), wherein degree of enhancement in the frequency enhancement processing is changed in accordance with the image density of the visualized image, and with a kind of the recording medium.

(9) The image recording apparatus of (6), wherein the frequency enhancement processing is applied in accordance with the image density of the visualized image, and with a kind of the ink.

(10) The image recording apparatus of (6), wherein the frequency enhancement processing is applied in accordance with the image density of the visualized image, with a kind of a recording medium, and with a kind of the ink.

(11) A image recording system for visualizing an image for medical diagnosis, comprising: an image input device for inputting an image signal; an image processing device for applying an image processing onto the image signal inputted through the image input device to form processed image data; a plurality of image output devices for forming a visible image based on the processed image data; and a controller for controlling the image input device, the image processing device, and the plurality of image output device, wherein the image processing device applies the image processing, which is correspondent to each of the plurality of image output device, onto the image signal inputted through the image input device so that approximately constant qualities of visible images are obtained regardless of characteristics of the plurality of the output devices.

(12) An image recording system for visualizing an image of medical diagnosis, comprising: an image input device for inputting an image signal; a plurality of image output devices for forming a visible image based on a transmitted image signal, wherein some of the plurality of image output devices has a different frequency response with each other; an image processing device for applying a frequency enhancement processing, which corresponds to a frequency characteristic of each of the plurality of image output device, onto the image signal inputted through the image input device, to form a plurality of processed image data; a memory device for storing a plurality of the processed image data; and a controller for controlling the image recording system, wherein the image input device, the plurality of image output device, the image processing device, and the memory device are connected to a network, wherein the controller retrieves and transmits the processed image data, which corresponds to a designated output device out of the plurality of image output devices, to form the visible image based on the transmitted image data by the designated output device.

(13) The image recording system of (12), wherein the plurality of image output devices comprise at least one inkjet image output device.

(14) The image recording system of (12), wherein the plurality of image output devices comprise at least one image recording device, which records an image on a recording medium, and one image viewer.

(15) An image recording system for visualizing an image of medical diagnosis, comprising: an image input device for inputting the image signal of medical diagnosis; a plurality of image output devices for forming a visible image based on the image signal, wherein some of the plurality of image output devices has a different frequency response with each other; a designation device for designating a specific image output device out of the plurality of image output devices; an image processing device for applying a frequency enhancement processing, which corresponds to a frequency response of the specific image output device, onto the image signal inputted through the image input device, to form a processed image data; and a controller for controlling the image recording system, wherein the image input device, the plurality of image output devices, the image processing device, and the designation device are connected to a network, wherein the specific image output device forms a visible image based on the processed image data.

(16) The image recording system of (15), wherein the plurality of image output devices comprise different methods of image output devices.

(17) The image recording system of (15), wherein the plurality of image output devices comprise at least one image recording device, which records an image on a medium, and one image viewer.

(18) The image recording system of (15), wherein the plurality of image output devices comprise at least one inkjet image output devices.

(19) The image recording system of (18), wherein the inkjet image output device employs plural inks of different densities and/or plural kinds of recording media.

(20) An image recording system for visualizing an image of medical diagnosis, comprising: a plurality of image input devices for inputting the image signal of medical diagnosis; a plurality of image output devices for forming a visible image based on the image signal, wherein some of the plurality of image output devices has a different frequency response with each other; a designation device for designating a specific image output device out of the plurality of image output devices; an image processing device for applying a frequency enhancement processing, which corresponds to a frequency response of the specific image output device, onto the image signal inputted through the image input device, to form a processed image data; a controller for controlling the image recording system, wherein the plurality of image input devices, the plurality of image output devices, the image processing device, and the designation device are connected to a network, wherein the specific image output device forms a visible image based on the processed image data.

(21) An image recording system for visualizing an image of medical diagnosis, comprising: a plurality of image input devices for inputting the image signal of medical diagnosis; a plurality of image output devices for forming a visible image based on the image signal, wherein some of the plurality of image output devices has a different frequency response with each other; a designation device for designating a specific image output device out of the plurality of image output devices; an image processing device for applying a frequency enhancement processing, which corresponds to a type of image input device through which the image signal is inputted and a frequency response of the specific image output device, onto the image signal inputted through the image input device, to form a processed image data; a controller for controlling the image recording system, wherein the plurality of image input devices, the plurality of image output devices, the image processing device, and the designation device are connected to a network, wherein the specific image output device forms a visible image based on the processed image data.

The following structures are also preferable to solve the above stated problems.

(101) An image recording apparatus for recording an image on a recording medium, characterized by comprising an image processing means for carrying out frequency enhancing processing to correct the lowering of the sharpness of the recorded image.

In addition, the lowering of the sharpness of the recorded image described in the above is produced in recording an image on a recording medium, caused by any one of or a combination of the aforesaid image recording apparatus, said recording medium, and the ink used in the recording.

That is, in this invention, it is put into practice in recording an image on a recording medium, to carry out a frequency enhancement processing for correcting the lowering of the sharpness of the recorded image caused by the aforesaid image recording apparatus, said recording medium, or the ink used in the recording.

As the result of this, an image recording apparatus capable of recording an image having no image blur in a simple method can be actualized.

(102) A medical-use image recording apparatus for recording a medical-use image on a recording medium, characterized by being provided with an image processing means for practicing frequency enhancing processing to correct the lowering of the sharpness of the recorded image.

In addition, the lowering of the sharpness of the recorded image described in the above is produced in recording an image on a recording medium caused by any one of or a combination of the aforesaid image recording apparatus, said recording medium, and the ink used in the recording.

That is, in this invention, it is put into practice in recording an image on a recording medium, to carry out a frequency enhancement processing for correcting the lowering of the sharpness of the recorded image caused by the aforesaid image recording apparatus, said recording medium, or the ink used in the recording.

As the result of this, an image recording apparatus capable of recording a medical-use image having no image blur and a high diagnosis capability in a simple method can be actualized.

(103) A medical-use image recording apparatus as set forth in the above-mentioned paragraph (102) wherein the frequency enhancement processing of the aforesaid image processing means is such one as to make the characteristic of the recorded image approximately agree with the characteristic of an inputted image signal.

Besides, it is desirable that this approximate agreement of the characteristics is actualized for spatial frequencies not higher than 3.0 cycles/mm.

(104) A medical-use image recording apparatus in which a medical-use image having a sharpness characteristic which becomes different depending on the density is recorded on a recording medium, characterized by comprising an image processing means for performing a frequency enhancement processing which is changed in accordance with the density of the image to be recorded.

In this invention, it is put into practice to perform a frequency enhancement processing which is changed in accordance with the density of the image to be recorded, because, in recording a medical-use image on a recording medium, a medical-use image having a sharpness characteristic which becomes different depending on the density is recorded on a recording medium.

As the result of this, it is possible to actualize an image recording apparatus capable of recording a medical-use image having no image blur and a high diagnosing capability.

Besides, it is desirable that this frequency enhancement processing to be changed is performed in such a way as to keep the frequency response after the correction by the image recording apparatus approximately constant in spite of the change of recording density. Moreover, it is desirable that this approximate consistency of the frequency response is actualized for frequencies not higher than 3.0 cycles/mm.

(105) A medical-use image recording apparatus as set forth in the above-mentioned paragraph (104) in which a medical-use image having a characteristic such that the sharpness becomes lower with the density becoming higher is recorded on a recording medium, wherein the aforesaid image processing means practices a frequency enhancement processing which has a higher degree of enhancement with the density of the image to be recorded becoming higher.

Besides, the characteristic such that the sharpness becomes lower with the density becoming higher is produced in recording an image on a recording medium, caused by any one of the aforesaid image recording apparatus, the recording medium, and the ink used in the recording, or a combination of these.

In this case, by making a medical-use image have a characteristic such that the sharpness becomes lower with the density becoming higher, an effect to prevent that the granularity becomes worse in the high density region is obtained, while the lowered sharpness characteristic can be corrected by the image processing; therefore, it becomes possible to obtain a medical-use image which is satisfactory in both the granularity and sharpness. In particular, it is effective for a medical-use image recording apparatus of an ink jet type in which the granularity in the high density region tends to become worse.

(106) A medical-use image recording apparatus as set forth in the above-mentioned paragraphs (102) to (105), wherein the aforesaid image processing means performs a frequency enhancement processing which is changed in accordance with the kind of the recording medium on which an image is recorded.

In this case, it is effective for an ink jet method, because the degree of the lowering of sharpness due to the spreading of ink becomes different, depending on the ink absorption capacity and the absorption speed of the recording medium on which an image is recorded. For example, it is possible to practice a processing which is made different between a medium of a swelling type and that of a vacant space type.

(107) A medical-use image recording apparatus as set forth in the above-mentioned paragraph (106), characterized by comprising a storage means for storing different conditions of frequency enhancement processing in correspondence to the kinds of the recording medium.

(108) A medical-use image recording apparatus as set forth in the above-mentioned paragraphs (102) to (107), wherein the aforesaid image processing means performs a frequency enhancement processing which is changed in accordance with the kind of the ink to be used in the recording of the image.

In addition, it is effective for an ink jet method, because the degree of the lowering of sharpness due to the spreading of ink changes in accordance with the physical property of the ink.

(109) A medical-use image recording apparatus as set forth in the above-mentioned paragraph (108), characterized by comprising a storage means for storing different conditions of frequency enhancement processing in correspondence to the kinds of ink.

(110) A medical-use image recording apparatus as set forth in the above-mentioned paragraphs (102) to (109), wherein the aforesaid image processing means performs a frequency enhancement processing which is changed in accordance with the kind of the input apparatus for an image to be recorded and the part of the radiographic object.

In this case, it is effective to practice, for example, a weak processing for a CT image and a strong processing for a CR image, or even for images of the same kind CR, a strong processing for a mammography image and a weak processing for others.

(111) A medical-use image recording apparatus as set forth in the above-mentioned paragraph (10), characterized by comprising a storage means for storing different conditions of frequency enhancement processing in correspondence to the kinds of the input apparatus for an image to be recorded and the part of the radiographic object.

(112) A medical-use image recording apparatus as set forth in the above-mentioned paragraphs (102) to (111) characterized by comprising an image recording means of an ink jet type, and carrying out the recording of an image by said image recording means.

(113) A medical-use image recording apparatus as set forth in the above-mentioned paragraphs (102) to (111) characterized by comprising an image recording means using a thermal head, and carrying out the recording of an image by said image recording means.

(114) A medical-use imaging system which is an imaging system using a plurality of image recording apparatus having different frequency response characteristics respectively, and recording and/or displaying a medical-use image, characterized by being provided with an image processing means for practicing a frequency enhancement processing which is changed in accordance with the frequency response characteristic of the image recording apparatus to record/display the image.

In this invention, it is put into practice, in recording and/or displaying a medical-use image by the use of a plurality of image recording apparatus having different frequency response characteristics respectively, to carry out a frequency enhancement processing which is changed in accordance with the frequency response characteristic of the image recording apparatus to record/display the image.

In this case, it is practiced a frequency enhancement processing which is made different, for example, between an image recording apparatus employing a silver halide dry development method and for an image recording apparatus employing a monochromatic ink jet method.

As the result of this, it is possible to provide an image having a stable image quality not influenced by the change of the density of the image to be recorded, and the change of the image recording apparatus and/or the image displaying apparatus.

(115) A medical-use imaging system as set forth in the above-mentioned paragraph (114), wherein the frequency enhancement processing by the aforesaid image processing means is such one as to make the characteristic of the image recorded approximately agree with the characteristic of the inputted image signal.

Besides, it is desirable that this approximate agreement of the characteristics is actualized for spatial frequencies not higher than 3.0 cycles/mm.

(116) A medical-use imaging system which is an imaging system comprising an image recording apparatus for obtaining a hard copy of an image and an image displaying apparatus for carrying out the display of an image, characterized by further comprising an image processing means for practicing a frequency enhancement processing which is changed between the case where an image is recorded by the image recording apparatus and the case where an image is displayed by the image displaying apparatus.

In this invention, it is put into practice to carry out a frequency enhancement processing which is changed between the case where an image is recorded by the image recording apparatus and the case where an image is displayed by the image displaying apparatus.

In this case, it is carried out a frequency enhancement processing which is changed, for example, between the case of the image display by a liquid crystal display apparatus and the case of the image recording by an image recording apparatus of a monochromatic ink jet type.

As the result of this, it is possible to provide an image having a stable image quality not influenced by the change of the density of an image to be recorded, and the change of the image recording apparatus and/or the image display apparatus.

(117) A medical-use imaging system as set forth in the above-mentioned paragraph (16), wherein the frequency enhancement processing of the aforesaid image processing means is such one as to make the characteristic of the image recorded approximately agree with the characteristic of the image displayed.

Besides, it is desirable that this approximate agreement of the characteristics is actualized for spatial frequencies not higher than 3.0 cycles/mm.

BRIEF DESCRIPTION OF THE DRAWINGS

FIG. 2(a-1) to FIG. 2(f) are explanatory drawings showing how correction is made in the embodiment of this invention;

FIG. 3(a) to FIG. 3(f) are explanatory drawings showing how correction is made in the embodiment of this invention;

FIG. 7(a1) to FIG. 7(d3) are explanatory drawings showing how correction is made in the embodiment of this invention;

FIG. 10(a-1) to FIG. 10(f) are explanatory drawings showing how correction is made in the embodiment of this invention.

DETAILED DESCRIPTION OF THE PREFERRED EMBODIMENT

In the following, with reference to the drawings, the embodiment of this invention will be explained in detail. In addition, this invention should not be limited to the concrete examples described in the embodiment shown below.

<Overall Structure of Medical-Use Image Recording Apparatus>

Figure 1:
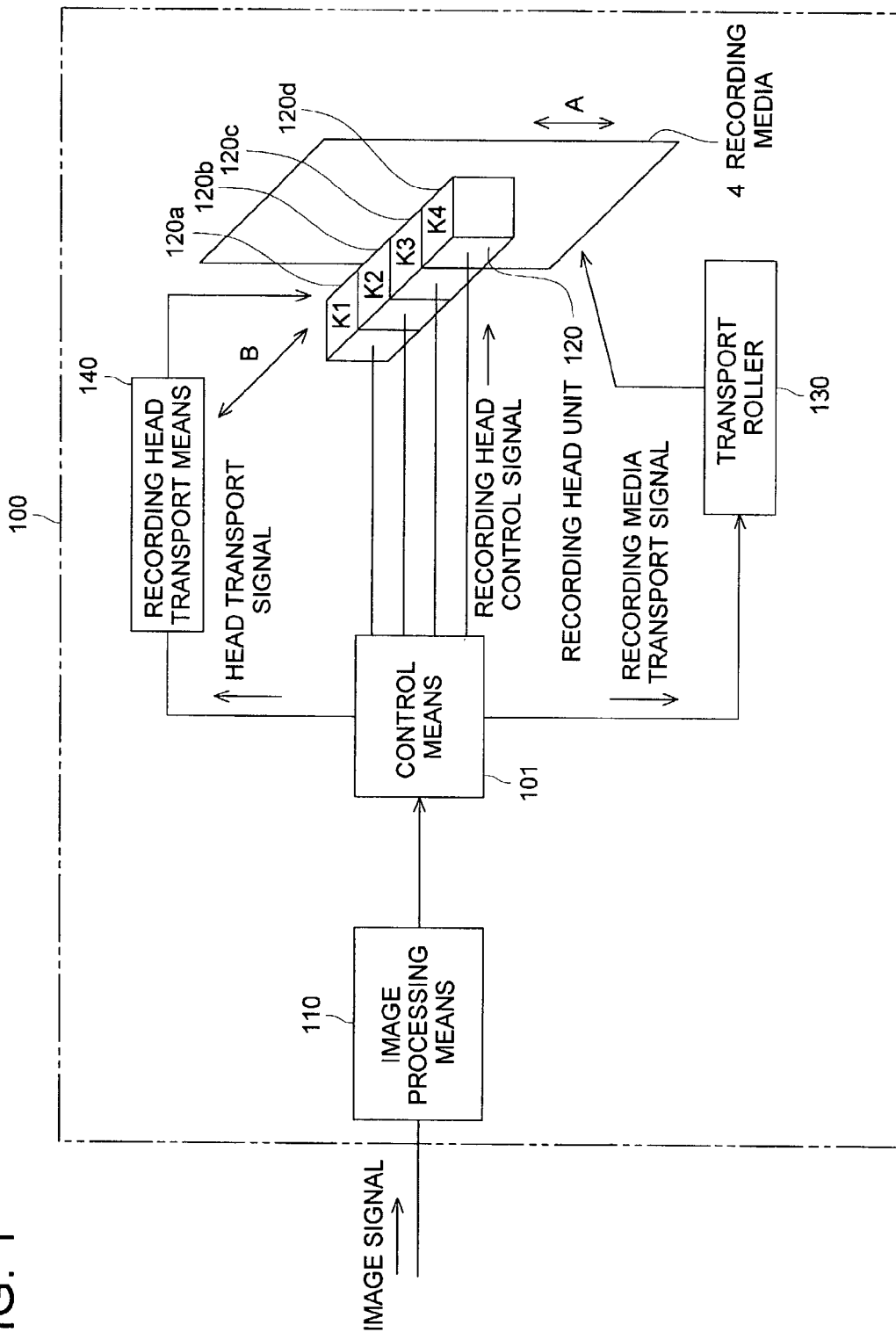
FIG. 1 is a block diagram showing the electrical structure of a medical-use image recording apparatus of the embodiment of this invention.

FIG. 1 is a block diagram for explaining the functional blocks relating to the image recording of a medical-use image recording apparatus. A medical-use image recording apparatus 100 of this example of the embodiment comprises a recording head unit 120 as a recording means for practicing image recording by the jetting of ink.

A control means 101 controls each part of the medical-use image recording apparatus 100 of this example of the embodiment. Further, the control means 101 practices a control in carrying out a frequency enhancement processing for correcting the lowering of sharpness of the recorded image caused by said medical use image recording apparatus, the recording medium, and the ink used in the recording.

110 denotes an image processing means to which an image signal is inputted from an external radiographing apparatus for medical use or a storage apparatus to undergo a necessary image processing. Besides, as regards the image processing which is characteristic of this example of the embodiment, it practices a frequency enhancement processing for correcting the lowering of sharpness of the recorded image caused by said medical-use image recording apparatus, the recording medium, and the ink used in the recording.

Further, the input of an image signal from the outside may be one through any one of various kinds of network. An image signal which has been processed by this image processing means 110 is sent to the control means 101.

In the recording head unit 120, there are provided recording heads 120a to 120d respectively containing 4 kinds of black ink of different densities, and a recording head control signal corresponding to the image signal is supplied from the control means 101 to each of them. These recording heads 120a to 120d may be built integrally or may be provided separately. In this way, by the image formation using different black inks of 4 kinds, as an image for the purpose of diagnosis or reference for medical treatment, an image having a higher image quality and a larger number of gray scales can be obtained. In order to produce an image for medical treatment which requires multiple gray scales, it is desirable to use black inks of at least 3 to 4 kinds having different densities respectively. Besides, in order to dissolve the streaky unevenness peculiar to a medical-use image recording apparatus, it is necessary to jet ink drops uniformly from the recording head towards the recording surface; as the result of it, with the increase of ink absorption amount, it is necessary to make the ink receiving layer thicker. If the ink receiving layer is made thicker, damages tend to be produced on the surface of the recording medium, and more attention should be paid to the handling of the recording medium.

As regards the ink jetting mechanism of the ink jet head, it may be one using a piezoelectric effect, or may be an ink jet method using a force caused by the formation of bubbles which are generated when ink is momentarily heated. As regards the number of the nozzle holes, one falling within a range of 64 to 512 is appropriate for an ink jet recording for medical treatment. The flight speed of ink drops is desirably 2 to 20 m/s, and the ink quantity of one jetted ink drop should desirably be 1 to 50 picoliters.

130 denotes a transport roller for transporting a recording medium sheet 4 in the main scanning direction. 140 denotes a recording head transport means for transporting the recording heads in the sub-scanning direction. In the drawing, a pair of transport rollers 130 transport the recording medium sheet 4 in the direction of the arrow mark A on the basis of a recording medium transport signal. Further, the recording head transport means 140 for moving the recording head unit 120 is arranged movably in the direction B which is perpendicular to the transporting direction of this recording medium sheet 4.

In the drawing, the recording head transport means 140 moves the recording head unit 120 in the direction of the arrow mark B on the basis of a head transport signal, and the recording heads 120a to 120d form an image on the recording medium sheet 4 on the basis of a recording head control signal. An image signal is transmitted to the control means 101 from the image processing means 110, to which an image signal from an external radiographing apparatus or a storage apparatus is inputted. In addition, the input to the image processing means may be done through a network.

Inputted image signal corresponds to an optical density of visualized image. This invention can be applied to both of a case where a density visualized image becomes higher with the value of the image signal becoming larger, and a case where a density visualized image becomes lower with the value of the image signal becoming larger.

(Explanation of Recording Medium)

A recording medium of this example of the embodiment is characterized by it that a monochromatic image can be substantially drawn on it with a liquid ink. It should desirably be a recording medium which is practically formed of a sheet having an area of 15 cm×10 cm or larger, has an radius figure at the four corners, has a thickness of 75 μm to 250 μm, is made of resin colorless or colored in blue, and has at least one ink absorption layer of a vacant space type on at least one side.

Further, if the thickness is smaller than 75 μm, the sheet tends to hang down to become difficult to handle, and on the contrary, if it is greater than 250 μm, it has the defect that it has a considerable weight for carrying a stack of sheets.

Because an X-ray film is colorless and transparent or blue-colored, in order that a user may not have a feel of disorder, it is desirable to use a support member made of colorless or blue-colored resin for the recording medium of this example of the embodiment.

Further, as regards a recording medium sheet of this example of the embodiment, it is a desirable mode that the recording medium sheet has at least one ink absorption layer of porous space type on at least one side, and the side having no ink absorption layer has a matte-processed layer for making better the transportability by the printer and for preventing the adhesion of neighboring films to each other.

A recording medium sheet of this example of the embodiment can be obtained by it that the vacant space ratio of the ink absorption layer is made large as much as possible, and roughness is produced on the surface by a matte processing or the like. Further, it is possible to add particles of white metal oxide such as titanium oxide or lead oxide in the ink absorption layer or in the underlying layer of it.

Also it is possible to provide a layer on the opposite side of the ink absorption layer of the supporting member to disperse particles of metal oxide such as titanium oxide or lead oxide in it, or also it is possible to provide an ink absorption layer on the both sides of the support member.

For the material of a recording medium of this example of the embodiment, a resin belonging to polyester group such as polyethyleneterephthalate, a resin belonging to the cellulose ester group such as nitrocellulose and cellulose acetate, and further, polysulfone, polyimide, polycarbonate, etc. can be used. Further, it is desirable that this sheet-shaped recording medium is colored in blue. This blue coloring is made in order that the excessive transmission light from the non-image area may not dazzle the observer as described in the above, and also an effect to make a black image appear more desirable can be obtained. For that reason, because an ink absorption layer is provided on at least one side of the sheet-shaped recording medium support, it is necessary to improve the adhesion ability for the ink absorption layer by the application of a corona discharging treatment, flame treatment, ultraviolet ray irradiation treatment, or the like to the recording medium support.

It is desirable that the ink absorption layer is a layer of a three-dimensional network structure having a vacant space ratio of 40% to 90%. It is desirable that this three-dimensional network structure is formed of silica fine particles or organic fine particles having an average particle diameter not greater than 20 nm, and the mass ratio of the silica or organic fine particles to the water-soluble resin falls within a range of 1.2:1 to 12:1.

In this case, fine holes forming the vacant spaces of the three-dimensional network structure have an average diameter of 5 nm to 40 nm, and the fine holes forming the vacant spaces have a fine hole capacity of 0.3 to 1.0 ml/g.

It is desirable that the silica fine particles are inorganic silicate and have 2 to 3 silanol radicals per 1 $nm^2$ of their surface, and the three-dimensional network structure is composed of chains formed of the coupling of secondary particles having a particle diameter of 10 nm to 100 nm composed of the aggregates of silica fine particles.

Besides, for the fine particles, for example, colloidal silica, calcium silicate, zeolite, kaolinite, halloysite, muscovite, talc, calcium carbonate, calcium sulfate, aluminum oxide, etc. can be used.

Further, for the water-soluble resin, polyvinyl alcohol is desirable, and for the examples of other water-soluble resins, gelatine and those resins disclosed in the publication of the unexamined patent application H7-276789 etc. can be cited.

It is desirable that the ink absorption layer has a specific surface area of 50 $m^2/g$ to 500 $m^2/g$. Further, in order to let the neighboring sheets in a stack of sheets not adhere to each other, it is desirable to disperse matting particles having an average diameter of 5 μm to 100 μm on the surface.

It is also possible to add a surface active agent as an antistatic agent.

As regards the layer having no ink absorption layer, it can be coated with gelatine or water-soluble resin for preventing curl. Further, also it is possible that this layer is processed by antistatic processing, matte processing for preventing adhesion, and coloring in blue; further, also it is possible to add metal oxide particles such as titanium oxide particles and zinc oxide particles to the layer.

When transmission X-ray images are radiographed, it often occurs that a large number of films are handled in a short time. In this case, in order to tell the front side of an image from the rear side at the first glance, it is desirable to make it possible to discriminate between the front and the rear side in a simple way by making a notch at the upper right corner of the sheet, for example.

<Explanation of Ink>

Further, in this example of the embodiment, it is possible that, by the use of an ink jet head unit which is a means for jetting inks of plural kinds independently, a plurality of inks having different color tones respectively are jetted to form an image. Further, also it is possible that, by the use of an ink jet head unit which is a means for jetting inks of plural kinds independently, a plurality of inks having the same color but different densities respectively are jetted to form an image.

That is, it may be appropriate to use separate ink jet heads for the respective ink densities of plural steps, for example, 2 steps, 3 steps, 4 steps, etc. of the same color with the above-mentioned inks used singly or in combination for each head. For example, in the case of monochromatic image formation, it is possible to use inks of K1, K2, K3, and K4. Further, if a color image is to be formed, the ink jet heads are used for inks of yellow (Y), magenta (M), cyan (C), and black (K) respectively.

As regards the coloring agent which is dissolved or dispersed in the water of the ink, any one of a pigment, a water-soluble dye, and a dispersion dye may be used.

For the pigment, the following can be cited: any organic or inorganic pigment known to the public can be used. For example, an azo pigment such as an azo lake, an insoluble azo pigment, a condensation azo pigment, and a chelate azo pigment; a polycyclic pigment such as a phthalocyanine pigment, perylene and a perylene pigment, an anthraquinone pigment, a quinacridone pigment, a dioxazine pigment, a thioindigo pigment, an isoindolenone pigment, and a quinophthaloni pigment; a dye lake such as a lake of a basic dye type, and a lake of acid dye type; an organic pigment such as a nitro-pigment, a nitroso-pigment, aniline black, and a daylight fluorescent pigment; and an inorganic pigment such as carbon black.

As regards the method of dispersing the pigment, various kinds of apparatus such as a ball mill, a sand mill, an attriter, a roll mill, an agitator, a Henschel mixer, a colloid mill, an ultrasonic homogenizer, a pearl mill, a wet-type jet mill, and a paint shaker can be used. Further, it is also possible to add a dispersion agent when pigment particles are dispersed. For the dispersion agent, an anion surfactant, an nonion surfactant, a high molecular dispersion agent, etc. can be cited.

As regards the ink to be used in this example of the embodiment, a black ink can be prepared by the use of a suitable pigment selected, a combination of dyes known to the public, or a dye of a single kind.

For the water-soluble dye, for example, an acid dye, a basic dye, and a reactive dye can be cited.

As regards the black dye, CI (Color Index) Direct Black 9, 17, 19, 22, 32, 51, 56, 62, 69, 77, 80, 91, 94, 97, 108, 112, 113, 114, 117, 118, 121, 122, 125, 132, 146, 154, 166, 168, 173, 199, etc. can be cited.

As regards the ink to be used in this example of the embodiment, a black ink can be prepared by the use of a suitable pigment selected, a combination of dyes known to the public, or a dye of a single kind.

For example, carbon black is used for the pigment, and an alcohol belonging to the ethyleneglycol group, a surface active agent or an antiseptic agent, etc. are mixed; thus, a black ink which is liquid and water-soluble at the normal temperature can be obtained.

In the case where a dye is used, a water-soluble black ink which is liquid at the normal temperature can be obtained by the preparation of a solution in which Direct Black 19, Direct Black 159, Surfer Black 1, Acid Black 2, or CI Food Black 2, ethyleneglycol, glycerine, a surface active agent, and an antiseptic agent are added. The Direct Black 19 (blue-colored ink) is used for the adjustment of color tone with a suitable amount mixed.

It is desirable as a method of image formation that a wide density range is covered by a combination of the above-mentioned inks having different densities and color tones, with the color tone being delicately varied along with the density variation of the image.

In the case where inks of different color tones are used, for the coloring agents, Acid Blue 9, Acid Red 52 or 94, Acid Yellow 23, Direct Yellow 86 or 142, etc. are used. As another example, it is a desirable mode of practice to use the ink which is disclosed in the publication of the unexamined patent application 2000-129182.

As regards an example of the water-soluble organic solvent, the following can be cited: any one belonging to the alcohol group (for example, methanol, ethanol, propanol, isopropanol, butanol, isobutanol, secondary butanol, tertiary butanol, pentanol, hexanol, cyclohexanol, benzyl alcohol, etc.); any one belonging to the multivalent alcohol group (for example, ethylene glycol, diethylene glycol, triethylene glycol, polyethylene glycol, propylene glycol, dipropylene glycol, polypropylene glycol, butylene glycol, hexane diol, pentane diol, grycerine, hexane triol, thiodiglycol, etc.); any one belonging to the multivalent alcohol ether group (for example, ethyleneglycolmonomethyl ether, ethyleneglycol-monoethyl ether, ethyleneglycolmonobutyl ether, diethyleneglycolmonomethyl ether, diethyleneglycolmonoethyl ether, diethyleneglycolmonobutyl ether, propyleneglycolmonomethyl ether, propyleneglycolmonoethyl ether, propyleneglycolmonobutyl ether, ethyleneglycolmonoethyl ether acetate, triethyleneglycolmonomethyl ether, triethyleneglycolmonoethyl ether, triethyleneglycolmonobutyl ether, ethyleneglycolmonophenyl ether, propyleneglycolmonophenyl ether, etc.); any one belonging to the amine group (for example, ethanol amine, diethanol amine, triethanol amine, N-methyldiethanol amine, N-ethyldiethanol amine, morpholine, N-ethyl morpholine, ethylene diamine, diethylene diamine, triethylene tetramine, tetraethylene pentamine, polyethylene imine, pentamethyldiethylene triamine, tetramethylpropylene diamine, etc.); any one belonging to the amide group (for example, formamide, N,N-dimethyl formamide, N,N-dimethylacetamide, etc.); any one belonging to the heterocyclic group (for example, 2-pyrrolidone, N-methyl-2-pyrrolidone, cyclohexyl pyrrolidone, 2-oxazolidone, 1,3-dimethyl-2-imidazolidin-one, etc.); any one belonging to the sulfoxide group (for example, dimethyl sulfoxide, etc.); any one belonging to the sulfone group (for example, sulfolane, etc.); urea; acetonitrile; and acetone.

It is also appropriate to add a surface active agent to the ink as occasion demands. For the surface active agent which are desirably added to the ink, the following can be cited: anion surface active agents such as any one belonging to the dialkylsulfosuccinate group, any one belonging to the alkylnaphthalenesulfonate, and any one belonging to the fatty acid salt group; nonion surface active agents such as any one belonging to the polyoxiethylenealkyl ether group, and any one belonging to the group of the block copolymer of polyoxiethylen-polyoxipropylene; and cation surface active agents such as any one belonging to the alkylamine salts, and any one belonging to the quaternary ammonium salts.

It is also possible to add to the ink, in addition to the above-mentioned, an antiseptic agent, an antifungal agent, a pH adjusting agent, a viscosity adjusting agent, etc. as occasion demands.

<Explanation of Operation of Medical-Image Recording Apparatus>

A medical-use image recording apparatus of this example of the embodiment comprises an image processing means 110 for correcting the lowering of sharpness caused by said medical-use image recording apparatus (refer to FIG. 1). For the image processing in this image processing means 110, what is called frequency enhancement processing can be employed. It is desirable that, as the result of the correction by this frequency enhancement processing, the characteristic of the inputted image signal and the characteristic of the recorded image become approximately equal to each other, because the frequency response characteristic of the inputted image data can be reproduced with a high fidelity.

In the following, explanation will be given with reference to FIG. 2. In this FIG. 2, the abscissa represents the spatial frequency and the ordinate represents the SWTF (Square Wave Transfer Function: the detail will be described later.) which expresses the frequency response characteristic.

In the case where an image signal inputted in the image recording apparatus has a frequency response characteristic as shown in FIG. 2(*a*-1), it is desirable that the frequency response characteristic of the image recorded on a hardcopy (FIG. 2(*c*)) reflects the frequency response characteristic of the image signal inputted to the image recording apparatus faithfully as much as possible (both frequency response characteristics are approximately equal to each other). However, if the frequency response characteristic of the image recording apparatus has such a characteristic as shown in FIG. 2(*b*) and FIG. 2(*e*), the frequency response characteristic of the image recorded on a hard copy becomes inferior to the frequency characteristic of the image signal inputted to the image recording apparatus, as shown in FIG. 2(*c*). Therefore, by applying a correction to the frequency characteristic of the image signal with the image processing means as shown in FIG. 2(*d*), the frequency response characteristic of the image recorded on a hard copy reflects the frequency response characteristic of the image signal inputted to the image recording apparatus (FIG. 2(*a*-2)) faithfully as shown in FIG. 2(*f*).

The product of the frequency characteristic of the image processing as shown in FIG. 2(*d*) and the frequency characteristic of the image recording apparatus as shown in FIG. 2(*e*) corresponds to the apparent frequency characteristic of the image recording apparatus with the image processing. If the apparent frequency characteristic mentioned above is 1 over the whole spatial frequency range, the frequency characteristic of the image recorded on a hard copy as shown in FIG. 2(f) is equal to the frequency characteristic of the image signal inputted to the image recording apparatus as shown in FIG. 2(a-2).

Actually in some cases, it is difficult to reflect the inputted frequency response characteristic over the whole spatial frequency range, because the information of a radiographic object that is important to image diagnosis is mostly contained in the part of the spatial frequency components not higher than 3.0 cycles/mm, it is appropriate if the spatial frequency components not higher than 3.0 cycles/mm can be faithfully reflected. That is, it is desirable that the apparent frequency response characteristic of the image recording apparatus is approximately 1 (0.95 to 1.05) for the spatial frequencies not higher than 3.0 cycles/mm.

Next, the correction of the frequency response characteristic of an image recording apparatus will be explained. The "uncorrected" frequency response characteristic of the image recording apparatus shown in FIG. 2(e) is measured beforehand, and the condition of the frequency enhancement processing having the characteristic shown in FIG. 2(d) is set to be applied by an image processing means to an image signal inputted to the image recording apparatus, such that the apparent frequency response characteristic is approximately 1. On the basis of the image signal having undergone this image processing, the image recording apparatus records the image; thus, the recorded image comes to have a frequency characteristic which is just the same as that of an image inputted to the image recording apparatus shown in FIG. 2(a-2).

Further, as regards an image recording apparatus of this example of the embodiment having a sharpness characteristic which is changed in accordance with the density of an image to be recorded, said image recording apparatus is characterized by practicing a frequency enhancement processing which is changed in accordance with the density of an image to be recorded to make a correction such that the image comes to have a sharpness characteristic approximately constant not influenced by the density change.

Especially in a recording apparatus of an ink jet type, for the reasons described in the following, it has a characteristic such that sharpness becomes poorer in high frequencies with the recording density becoming higher in some cases; therefore, it is desirable to practice an image processing having a higher degree of enhancement with the density of an image to be recorded becoming higher, and also with the frequency becoming higher.

In recording a transmission image for medical use by an ink jet method, in order to actualize a high transmission density, it is necessary to jet a large amount of ink to the recording medium especially in the high density region. If the amount of ink deposition on the recording medium increases, also the amount of solvent which occupies the most part of the ink increases. Especially in the case of a recording medium of a vacant space type, when it contains a large amount of solvent, the dye substance in the ink becomes easy to move in the recording medium, which generates the spreading of the ink. As the result of that, it has been raised a problem that sharpness was lowered more in the high density region than in the low density region.

Further, it is desirable to make the dot diameter larger with the ink density becoming higher by making larger the nozzle diameter of the head to jet high density ink drops, or by making the ink have a physical property such that it becomes easier to spread with its density becoming higher, because it becomes possible to prevent the degradation of granularity in the high density region. In this case too, for example, even if the amount of ink jetted to the recording medium is kept constant not influenced by the density change, it is produced a problem that sharpness is lowered more in the high density region than in the low density region.

As described in the foregoing, although an image recorded by an ink jet method has a characteristic such that the sharpness becomes poorer with the recording density becoming higher, image processing can correct the lowering of the sharpness while making the most of its advantage that it can improve characteristics other than sharpness such as transmission density and granularity; therefore, all of the characteristic of image density, granularity, and sharpness can be kept satisfactory; this is desirable.

Further, also in a recording method using a thermal head, the heat quantity to be given to the recording medium increases with the density of an image to be recorded becoming higher, which makes an image blur tend to occur caused by heat diffusion; therefore, it is desirable to practice an image processing having a higher degree of enhancement with the density of an image to be recorded becoming higher.

In the following, explanation will be given with reference to FIG. 3. The abscissa in FIG. 3(a) to FIG. 3(c) represents the spatial frequency, and the ordinate represents the SWTF expressing the frequency response characteristic. In FIG. 3(b), the frequency response characteristic of the image recording apparatus becomes different for image densities 0.5, 1.5, and 2.5; this is an example of the case where sharpness becomes poorer with the image density becoming higher. In such a case, the condition of the frequency enhancement processing to be practiced by the image recording apparatus is determined to be such one, as shown in FIG. 3(a), that the degree of enhancement is made higher with the recording density becoming higher. It is desirable this processing condition determined is stored in a storage device (not shown in the drawing). By the practice of such a processing, a result is obtained which is the same as one that results from the recording of an image by an image recording apparatus having a frequency response characteristic which is kept approximately constant not influenced by the change of recording density as shown in FIG. 3(c). In this case, it is also desirable that the apparent frequency response characteristic of image recording apparatus with correction is kept approximately constant not influenced by the change of density for spatial frequencies not higher than 3.0 cycles/mm, and it is more desirably that the response characteristic is approximately 1 (0.95 to 1.05).

FIG. 3(d) to FIG. 3(f) are drawings in which the abscissa represents the diffuse transmission density and the ordinate represents the SWTF at the spatial frequency 3.0 cycles/mm. It is understood that, by the practice of a frequency enhancement processing having a higher degree of enhancement with the density of an image to be recorded becoming higher in an image recording apparatus having a characteristic that the sharpness becomes poorer with the density of an image to be recorded becoming higher, a result is obtained which is the same as one that is brought about from the recording of an image by an image recording apparatus having a characteristic that the sharpness is kept constant not influenced by the change of the density of an image to be recorded.

In the above explanation, the frequency response characteristics of image recording apparatus means not only the frequency response characteristics caused by the image recording apparatus itself such as ink jetting head or signal controlling method but also the frequency response characteristics caused by the physical property of material such as the ink and/or recording medium.

In the above explanation, the frequency response characteristic is expressed by an SWTF (square wave transfer function); however, if it is expressed by an MTF (modulation transfer function), the operation and the effect are the same. In the following, an SWTF and an MTF will be explained.

Figure 9A:
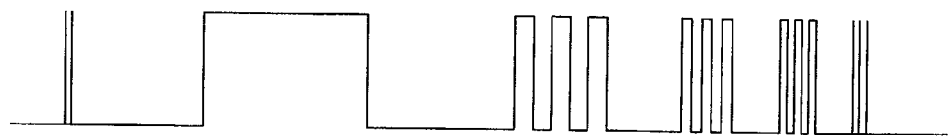
FIG. 9(a) to FIG. 9(c) are explanatory drawings showing a sharpness evaluation test pattern.
Figure 9B:
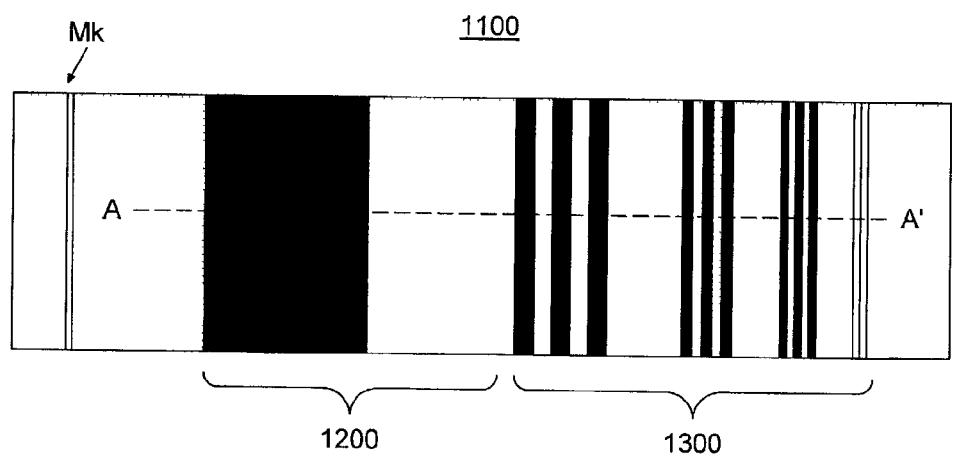
Figure 9C:
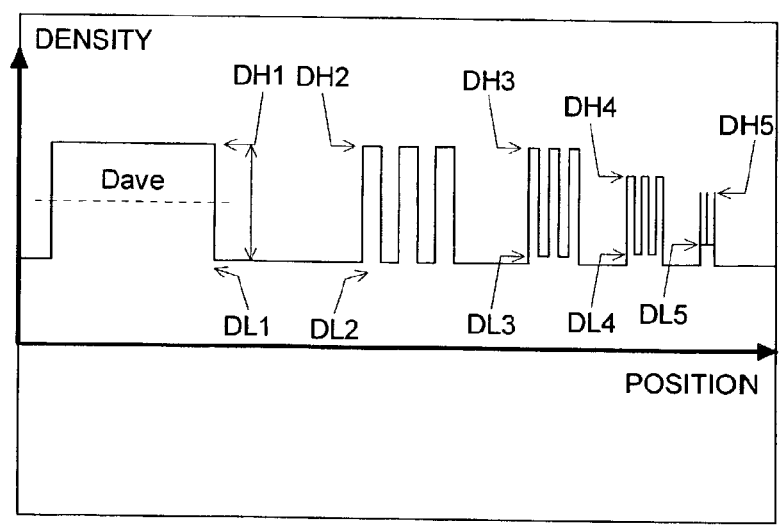

A test pattern image for sharpness evaluation 1100 in FIG. 9(*b*) is a test pattern image for evaluating sharpness, and FIG. 9(*a*) shows its density profile. The term "sharpness evaluation" used here is equivalent to the obtaining of the above-mentioned SWTF or MTF. The test pattern image for sharpness evaluation 1100 comprises a normalization reference part 1200 of the lowest spatial frequency and normalization parts 1300 of other spatial frequencies. In the normalization reference part 1200 or the normalization parts 1300 of the test pattern image for sharpness evaluation 1100, groups of bars arrayed at specified intervals along the main scanning direction (writing direction) of the recording apparatus are formed. Hereinafter, these groups of bars are referred to as chart elements and an arrangement of the chart elements is referred to as a chart.

The SWTF is called a square wave response function in other words, and is generally calculated in the following way. First, image data corresponding to the rectangular wave chart are produced, and an image is recorded by the image recording apparatus on the basis of the image data, to give the square wave chart image. For example, in a square wave chart image having N chart elements, with the chart elements given their number in the order of spatial frequency from the lowest first, i=1 stands for the normalization reference spatial frequency, and i=2 to N stand for the normalization spatial frequencies. Now, the density value in the peaks and valleys at the ith chart element (i=1 to N) of the profile is averaged over the peak portions and valley portions separately, and the density DHi at the high level and the density DLi at the low level are obtained. By the use of these two values, the contrast Ci=(DHi−DLi)/(DHi+DLi) is obtained. Because the frequency is extremely low at the normalization reference part, it is assumed that the degradation of sharpness hardly occurs. The value of the quotient obtained by the division such that the contrast at a normalization part is divided by the contrast at the normalization reference part, that is, the ratio SWTF (ui)=Ci/C1 is called the SWTF (ui), where "ui" denotes the spatial frequency of the "i"-th chart element.

Further, the term "MTF" is the abbreviation of modulation transfer function, and is equivalent to the spatial frequency response characteristic with respect to sine waves. Now, the method of calculating an MTF by the used of a square wave chart will be explained. On the basis of the plot of N points in an SWTF (ui) obtained by the above-mentioned method, a smooth approximate curve SWTF (u) is produced, and it is converted into an MTF (u) by the use of Coltman's equation. The detail of the equation is described, for example, in "Radiation Image Information Engineering (1)" (authored by Uchida et al; edited by Japanese Society of Radiological Technology) pp. 167 to 172.

For the method of the frequency enhancement processing, a method of unsharp mask processing, a method in which an image signal undergoes a Fourier transformation and a filter processing in the frequency space, and then the inverse Fourier transformation is applied to it, etc. can be cited. In this specification, what is called an unsharp mask processing will be explained.

By a frequency enhancement processing, for example, sharpness can be controlled by an unsharp mask processing shown in the following equation. In addition, as regards this control, it is possible to apply to it a method shown in the publication of the unexamined patent application S55-163472, the publications of the examined patent application S62-62373 and S62-62376.

$$Sout=Sorg+F(Sorg-Sus),$$

where Sout denotes image data after the processing, Sorg denotes image data before the frequency enhancement processing, Sus denotes an unsharp data obtained by the average processing or the like of image data before the frequency enhancement processing, and F(Sorg−Sus) denotes a correction quantity and is a function of (Sorg−Sus). In addition, in this specification, it will be explained the case where the density of an image to be recorded becomes higher with the value of Sorg becoming larger.

Figure 4:
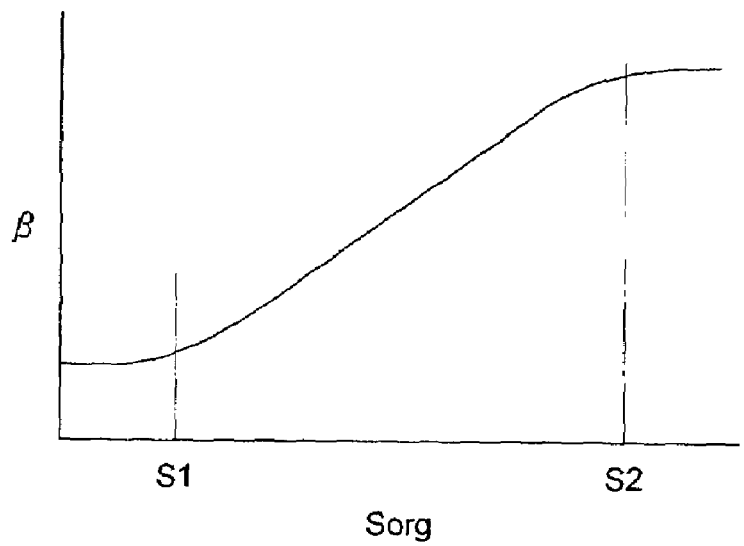
FIG. 4 is an explanatory drawing showing the relation between the enhancement coefficient and the image data in a correction in the embodiment of this invention.

In this frequency enhancement processing, for example, the function F(Sorg−Sus) is given by the function form β×(Sorg−Sus). In this expression, the enhancement coefficient β is a function of Sorg as shown in FIG. 4. By making the enhancement coefficient β vary with the increase of Sorg, it is possible to practice a frequency enhancement processing which is changed in accordance with image density. Because β monotonously increases approximately linearly between the reference values S1 and S2, it is possible to practice a stronger enhancement processing with the density of an image to be recorded becoming higher. In addition, it is possible to let β be a function of Sus. In a case where a density of visualized image becomes lower with the value of the image signal becoming larger, by making the enhancement coefficient β decrease with the increase of Sorg or Sus, it is possible to practice a stronger enhancement processing with the image density to be recorded becoming larger. If β does not depend on Sorg or Sus and is constant, the degree of enhancement becomes constant not influenced by the change of the density of an image to be recorded.

Figure 5:
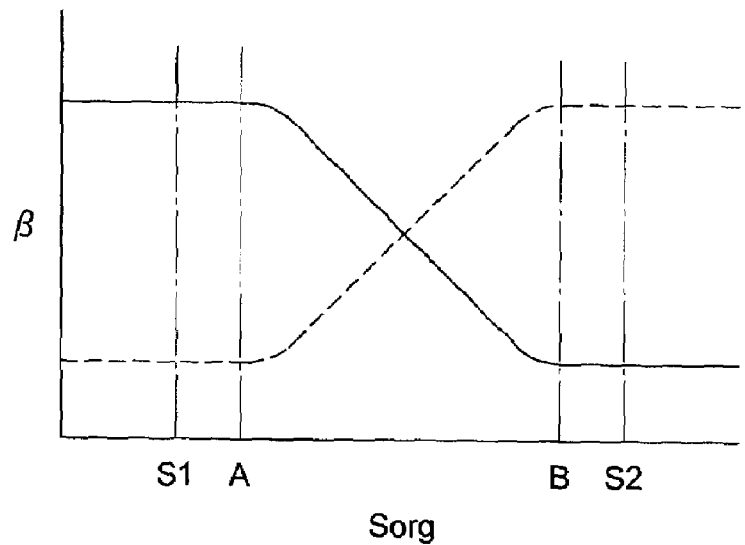
FIG. 5 is an explanatory drawing showing the relation between the enhancement coefficient and the image data in a correction in the embodiment of this invention.

Further, as shown by the solid line in FIG. 5, in the case of enhancement for the lower density region, β in the range of the reference value S1 to the value "A" is made maximum, and β in the range of the value "B" to the reference value S2 is made minimum. Further, for the range of the value "A" to the value "B", β is varied approximately linearly. In the case of enhancement for the higher density region, as shown by the broken line in FIG. 5, β in the range of the reference value S1 to the value "A" is made minimum, and β in the range of the value "B" to the reference value S2 is made maximum. Further, in the range of the value "A" to the value "B", β is varied approximately linearly. In addition, although it is not shown in the drawing, in the case of enhancement for the medium density region, β in the range of the value "A" to the value "B" is made maximum. In this way, by a frequency enhancement processing, sharpness in an arbitrary density region can be controlled by means of the function F.

In the above-mentioned example, by varying the enhancement coefficient β in accordance with Sorg or Sus, different frequency enhancement processings are practiced, and it can be said that a frequency enhancement processing which is changed in accordance with the density of an image to be recorded is practiced as the result of that; however, the method of this frequency enhancement processing in accordance with the image density is not limited to this. For example, it is also appropriate to change the mask size at the time of obtaining Sus in accordance with Sorg. By changing the mask size, it is possible to change the spatial frequency to be enhanced or the amount of enhancement.

In addition, in this example of the embodiment, the unsharp mask processing which is described in the above-mentioned examples known to the public is not used simply as it is. The difference from the examples known to the public will be explained with reference to the Figures.

Incidentally, FIG. 10(a-1) to FIG. 10(f) show SWTF's with the abscissa representing the diffuse transmission density and the ordinate representing the SWTF at the spatial frequency 3.0 cycles/mm.

Further, FIG. 10(a-1) and FIG. 10(a-2) show the frequency response characteristic of an image to be inputted in an image recording apparatus, and it has a characteristic such that SWTF becomes higher with the image density becoming higher.

Incidentally, the diffuse transmission density is measured as the average density of a portion of the image for evaluation where density is approximately uniform by means of a densitometer PDA-65 (manufactured by Konica Corp.). The average density means the average value of the density measured in the case where diffuse density measurement at arbitrary different 5 points is carried out by means of the above-mentioned densitometer.

As the result of the application of an image processing in which $\beta$ monotonously increases as shown in FIG. 4 in the above-mentioned examples known to the public, it can be obtained an image having a higher sharpness with the image density becoming higher as described in the above. As regards the image processing in the example known to the public, it is an image processing appropriate for the sharpness and granularity of an original image information to undergo it, and the result is such one that should be faithfully reflected in the image recorded on a hard copy.

However, as shown in FIG. 10(b), if an image is recorded by an image recording apparatus having a frequency response characteristic which becomes poorer with the density of an image to be recorded becoming higher, the result is that the image has such a frequency characteristic as shown in FIG. 10(c), and it cannot be obtained a hard copy just as the intended one having an image whose sharpness becomes higher with the image density becoming higher; nevertheless, in the above-mentioned examples known to the public, it is not supposed such a change of the frequency response characteristic to be produced by an image recording apparatus.

This example of the embodiment shows an image recording apparatus to solve the above-mentioned problem, which is characterized by comprising an image processing means for practicing frequency processing in accordance with its frequency response characteristic.

Hence, with the sharpness or granularity of the original image information taken into consideration, in the case where it is desirable that an image recording apparatus has a characteristic such that SWTF becomes higher with the image density becoming higher, first, in an image inputting apparatus or in an image processing apparatus connected to it, an image processing having a higher degree of enhancement with the image density becoming higher; then, at the time the image signal as shown in FIG. 10(a-2) is inputted in an image recording apparatus of this example of the embodiment, an image processing having a higher degree of enhancement with the image density becoming higher (as shown in FIG. 10(d)) is to be applied. With the above processing, the frequency characteristic of the recorded hard copy (as shown in FIG. 10(f)) becomes an image whose sharpness becomes higher with the image density becoming higher same as the image signal inputted in the image recording apparatus (FIG. 10(a-2)).

Between a frequency enhancement processing with the sharpness or granularity of an original image information taken into consideration and a frequency enhancement processing for correcting the degradation of sharpness caused by an image recording apparatus, there is some difference in the object, which results in it that there is some difference also in the degree of enhancement and the frequency band to be enhanced; therefore, the technological concept becomes different between the frequency enhancement processing in the above-mentioned examples known to the public and the frequency enhancement processing of this example of the embodiment.

For example, in the frequency enhancement processing described in the publication of the unexamined patent application S55-163472, it is considered desirable an unsharp mask having a modulation transfer function becoming not greater than 0.5 for frequencies in an ultra-low frequency region of 0.01 cycle/mm to 0.5 cycle/mm. This means that enhancement should desirably practiced for frequencies in an ultra-low frequency region of 0.01 cycle/mm to 0.5 cycle/mm.

However, in an image recording apparatus, it never occurs that its frequency response characteristic is degraded in the ultra-low frequency region of 0.01 cycle/mm to 0.5 cycle/mm; in a frequency enhancement processing in this example of the embodiment, it is not necessary to practice the enhancement processing in an ultra-low frequency region of 0.01 cycle/mm to 0.5 cycle/mm, but an enhancement processing in a frequency region higher than that is necessary. For example, as regards the unsharp mask, it is desirable one having a modulation transfer function or an SWTF not less than 0.6 for frequencies in an ultra-low frequency region of 0.01 cycle/mm to 0.5 cycle/mm, and having a modulation transfer function or an SWTF not greater than 0.4 for frequencies in a spatial frequency range of 2.0 cycles/mm to 4.0 cycles/mm.

In a medical-use image recording apparatus of an ink jet type, caused by the difference in the ink absorption capacity and absorption speed between recording media, the degree of degradation of sharpness owing to the spreading of ink becomes different between the different recording media. For example, a recording medium of a swelling type has a different sharpness characteristic from that of a vacant space type. Therefore, it is desirable to practice a frequency enhancement processing which is changed in accordance with the kind of the recording medium to be used.

Further, the ink absorption capacity and the ink absorption speed become different even between different recording media belonging to the same vacant space type; therefore, in that case, it is desirable to practice a processing changed for each.

It is desirable that an image recording apparatus comprises a storage means for storing the kinds of the recording medium and the different conditions of the frequency enhancement processing in correspondence to each other, and practices the image processing on the basis of the correspondence relation stored. For example, with the different function types of the enhancement coefficient $\beta$ in the above-mentioned unsharp mask processing denoted by $\beta 1$, $\beta 2$, and $\beta 3$, it is enough to store a table as shown in Table 1.

TABLE 1

| Kind of recording medium | Function type of β |
|---|---|
| Swelling type | β1 |
| Vacant space type (1) | β2 |
| Vacant space type (2) | β3 |

The most general method for obtaining the absorption speed of an ink into a recording medium is a method in which the absorption coefficient Ka is obtained by a Bristow method. In addition, the term "absorption coefficient" means a numerical value obtained by a measurement according to what is called a Bristow method, that is, a test method of liquid absorption ability of a paper or a paper board specified in J. TAPPI test method of paper and pulp Nos. 51 to 87, which is the standard of the Japan Technical Association of Pulp and Paper Industry.

Now, the Bristow method will be explained simply. This Bristow method is a method for measuring the liquid absorption behavior of a recording medium for a short time; its principle is as follows. A head box with a known amount of liquid added is brought into contact with a test piece moving at an arbitrary constant speed, and the liquid is completely absorbed by the paper surface through a slit. The transfer quantity V of the liquid, with the amount of liquid added to the head box denoted by X μl, and the length of the transfer track left by the liquid until it finishes the transfer to the paper surface (tracing length) denoted by A mm, is expressed by the following equation:

Transfer quantity of the liquid $V$ (ml/m$^2$)={$X$(βl)× 1000}÷{$A$(mm)×Slit length (mm)}.

Further, the absorption time T is defined as the contact time expressed by the following equation using the slit width and the moving speed of the test piece:

Absorption time $T$ (ms)={Slit width (mm)× 1000}÷{Paper moving speed (mm/s)}.

From the absorption time and the transfer quantity of the liquid, it is possible to know the absorption characteristic of a paper or a paper board for an extremely short time.

Figure 8:
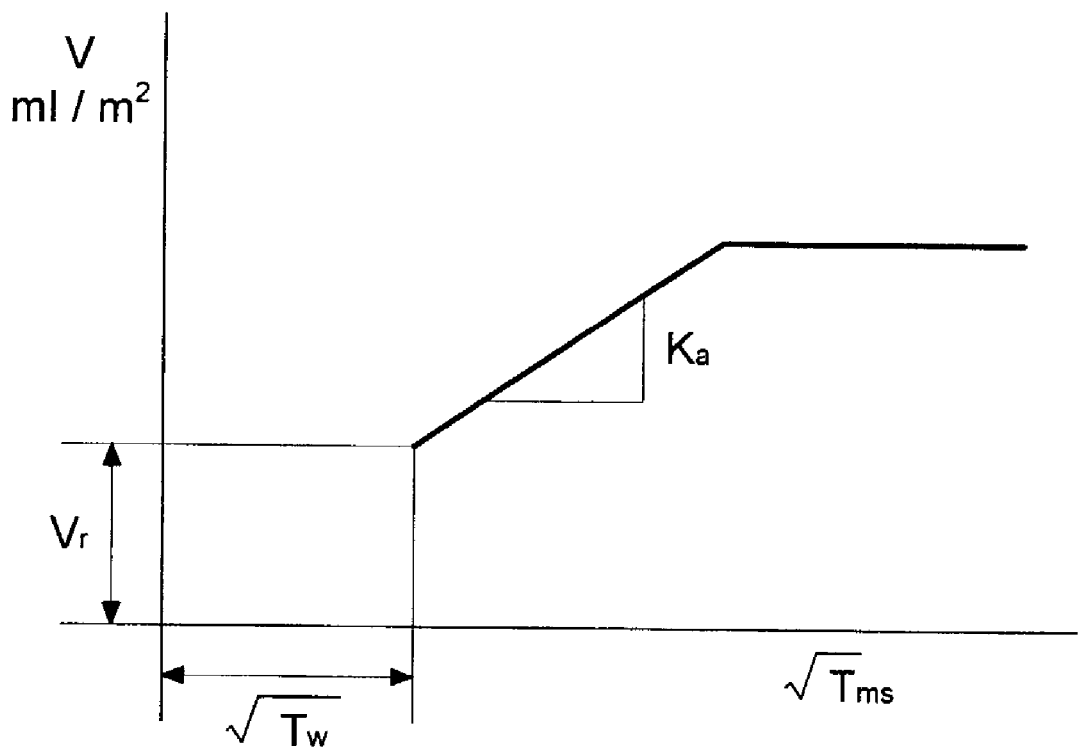
FIG. 8 is an explanatory drawing showing a typical Bristow absorption characteristic.

FIG. 8 is a characteristic graph showing a typical Bristow absorption characteristic. To plot the transfer quantity vs. the square root of the absorption time, generally, an absorption curve and an absorption equation as shown in FIG. 8 are obtained. Further, the relation between the transfer quantity and the absorption time is expressed by the equation $V=Vr+Ka(T-Tw)^{1/2}$, where V denotes the transfer quantity (ml/m$^2$), Vr denotes the roughness index (ml/m$^2$), Ka denotes the absorption coefficient (ml/m$^2$. (ms)$^{1/2}$), T denotes the absorption time, and Tw denotes the wetting time (ms). In the above equation, the roughness index Vr does not depend on the osmosis of the liquid at all, but it depends on the roughness etc. of the surface. The absorption coefficient Ka is an index representing the rapidness of absorption, and it relates to the contact angle between the liquid an paper, the capillary radius of the paper surface, the viscosity of the liquid, and the surface tension of the liquid. The wetting time Tw is one to be observed when the contact angle between the liquid and the paper is large, and is the time from the timing when the liquid wets the surface of the paper fibers to the start of absorption.

The ink absorption coefficient Ka is determined by the state of the recording medium surface, the physical property of the ink, and the wettability of the ink to the recording medium, and the larger Ka becomes the higher the absorption speed of the ink is judged to be, and the smaller Ka becomes the lower the absorption speed of the ink is judged to be. When the absorption speed of an ink is judged, it is enough to use the absorption coefficient Ka as the index.

Besides, the ink absorption capacity can be defined as the liquid transfer quantity V in the case where the absorption time T in the above-mentioned Bristow method is sufficiently large. For example, it is expressed by the average value of V in the case where the square root of the absorption time T (ms) falls within a range of 40 to 50.

As regards the method for detecting the kind of a recording medium, it can be coped with by the previous addition of an identification sign to the recording medium 4, and the identification sign of the recording medium 4 is read by a sensor or the like. In this case, for example, it can be used some kind of identification information for discriminating the kinds of the recording medium such as the description of the recording medium, the lot number, the recording characteristic, the manufacturer, etc. Especially, it is desirable that the identification information is the information that makes it possible to recognize the difference whether it is a transmission recording medium or a reflection recording medium, the difference in the reflection density or transmission density between recording media, the difference in the color tone between recording media (for example, the difference whether it is a transmission recording medium having a blue base or a transmission recording medium having a clear base), the difference in the ink absorption characteristic between recording media, etc. In this case, a sign made from the above-mentioned identification information is put on each sheet of recording media. For example, a numeral, a letter out of the English alphabet, or a combination of these can be used. Further, it may be a sign that is made of a figure such as a bar code. In the case of a bar code, from the view point of the ease of reading, a one-dimensional bar code is desirable.

Further, because the degree of degradation of sharpness owing to the spreading of ink becomes different with the change of the physical property of the ink, it is desirable to practice a frequency enhancement processing which is changed in accordance with the kind of the ink to be used.

Further, it is desirable that an image recording apparatus comprises a storage means for storing the different conditions of frequency enhancement processing in correspondence to the kinds of ink, and practices image processing on the basis of the stored correspondence relation. For example, with the different function types of the enhancement coefficient β in the above-mentioned unsharp mask processing denoted by β1, β2, and β3, it is appropriate to store such a table as shown in Table 2.

TABLE 2

| Kind of ink | Function type of β |
|---|---|
| dye ink (1) | β1 |
| dye ink (2) | β2 |
| pigment ink | β3 |

Further, with reference to the appointment information of an image diagnosis, from the information of the radiographic object contained in the appointment information, it is possible to identify the image input apparatus, and the radiographed part or tissue. In this case, it is appropriate to refer to the appointment information stored in an apparatus connected to a network in connection with the image.

<Explanation of Operation of Medical-Use Image Recording System>

Figure 6:
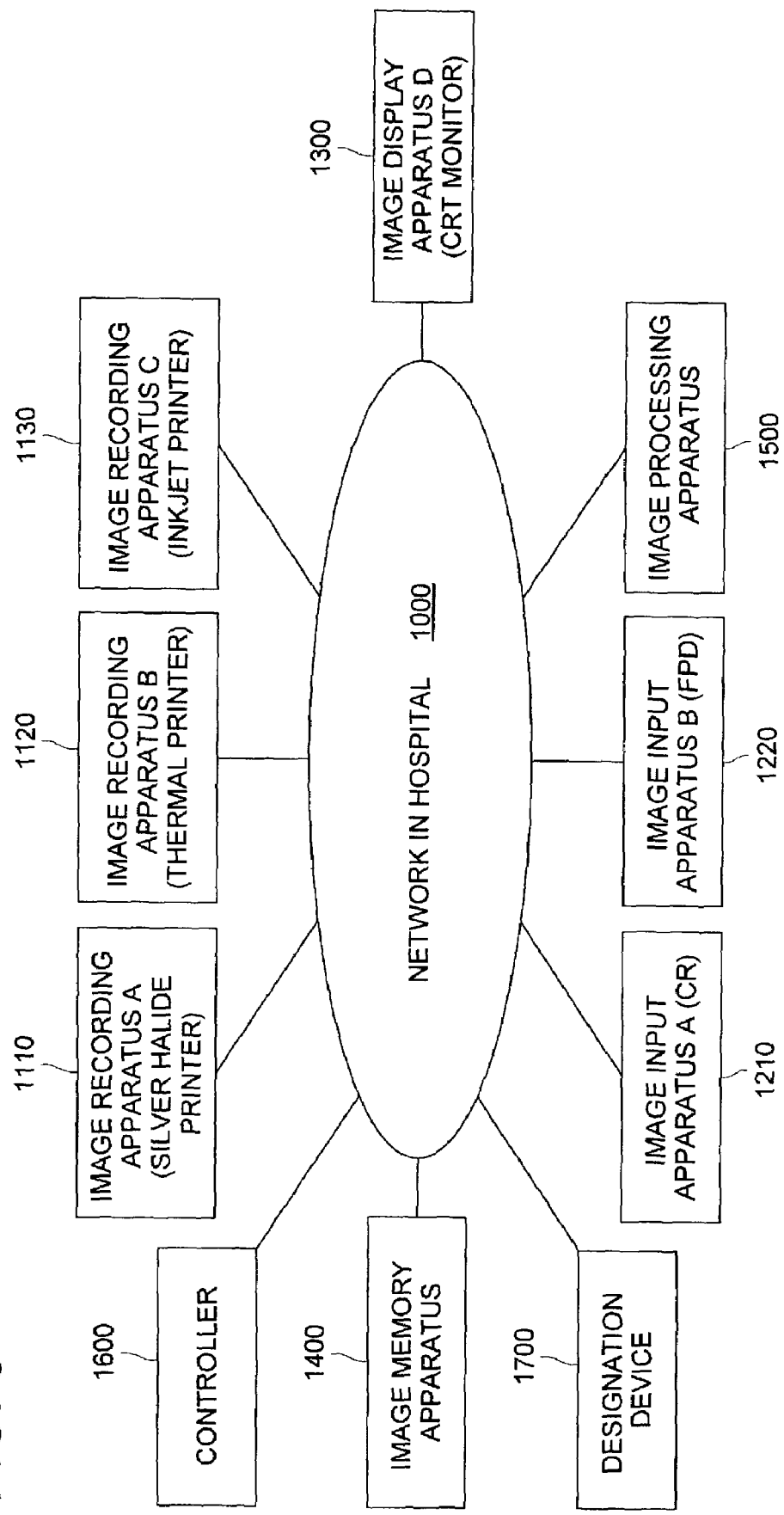
FIG. 6 is a block diagram showing the electrical structure of a medical-use imaging system of the embodiment of this invention.

A medical-use image recording system of this example of the embodiment, as shown in FIG. 6, is an image recording system for recording a medical-use image by means of a plurality of image output devices (the image recording apparatus 1110 to the image recording apparatus 1130 and the image display apparatus (image viewer) 1300) through a network 1000, characterized by being provided with an image processing apparatus 1500 for practicing a frequency enhancement processing which is changed in accordance with the frequency response characteristic of the image output devices. The medical-use image recording system is further provided with a plurality of image output devices (1212, 1220), the memory device 1400, the controller 1600 and the designation device 1700, and all these devices are connected to the network 1000.

Besides, it is desirable that the image processing apparatus 1500 practices a frequency enhancement processing in order that the frequency response characteristic of the result of the recording in said image recording system may be kept approximately constant.

As the result of this, it is possible to provide an image having a stable image quality not influenced by the change of the density of an image to be recorded and/or the change of the image recording apparatus or the image display apparatus.

Further, as shown in FIG. 6, a medical-use imaging system of this example of the embodiment is an image recording system which outputs a medical-use image by means of image recording apparatus (1110–1130) and an image display apparatus (image viewer) 1300 having different frequency response characteristics respectively through a network 1000, and is characterized by being provided with an image processing apparatus for practicing a frequency enhancement processing which is changed between the case where an image is outputted by the image recording apparatus and the case where an image is outputted by the image display apparatus.

Further, in this image recording system, image signals inputted through the image input device are processed with the image processing, which corresponds to the characteristic of each image output devices to form processed image data. The processed image data are stored in the memory device 1400. When a specific output device is designated by the designation device 1700, the controller 1600 controls to retrieve and transmit the processed image data corresponding to the specific output device and to output the visible image from the specific output device. By this, visible images with constant characteristics are obtained.

Incidentally, in the above embodiment, image processed image data are previously stored in the memory device, however, the other embodiment is also preferable where the image signal is processed by the image processing device after the output device is designated, and outputted by the output device without using the previously processed and stored image data.

Besides, it is desirable that the image processing apparatus 1500 practices a frequency enhancement processing in order that the frequency response characteristic of the result of the recording or the display in said image recording system may be kept approximately constant.

As the result of this, it is possible to provide an image having a stable image quality not influenced by the change of the density of an image to be recorded or the change of the image recording apparatus and/or the image display apparatus.

Further, it is shown in FIG. 7 an example in which a processing is carried out in order that the frequency response characteristic of the result of display in the aforesaid medical-use imaging system may be kept approximately constant.

In this example, it is assumed a case where a little amount of lowering of the SWTF characteristic of the image recording apparatus A is produced smoothly for higher frequencies approximately in the same way at the densities D=0.5, D=1.5, and D=2.5 as shown in FIG. 7($a2$). Now, for example, let it be considered the case where this image recording apparatus A is taken for the reference. In this case, in the image processing apparatus 1500, a frequency enhancement processing is not applied to the SWTF characteristic (FIG. 7($a1$)). As the result of that, image recording is carried out with the characteristic of the image recording apparatus A as it is (FIG. 7($a3$)).

Further, it is assumed that the SWTF characteristic of the image recording apparatus B is lowered considerably for higher frequencies without being so much influenced by the change of the density as shown in FIG. 7($b2$). In this case, in the image processing apparatus 1500, a processing for enhancing the higher frequency components is applied to the SWTF characteristic (FIG. 7($b1$)). In addition, the same correction is done regardless of the difference in the density. As the result of that, image recording is performed also by the image recording apparatus B with the same characteristic as the image recording apparatus A (FIG. 7($b3$))

Further, it is assumed that the SWTF characteristic of the image recording apparatus C is influenced by the change of the density and is lowered considerably for higher frequencies in the case of higher densities as shown in FIG. 7($c2$). In this case, in the image processing apparatus 1500, a processing for enhancing the higher frequency components in accordance with the density is applied to the SWTF characteristic (FIG. 7($c1$)). As the result of that, image recording is performed also by the image recording apparatus C with the same characteristic as the image recording apparatus A (FIG. 7($c3$)).

Further, it is assumed that the SWTF characteristic of the image display apparatus D is influenced by the change of the density and is lowered considerably for higher frequencies in the case of lower densities as shown in FIG. 7($d2$). In this case, in the image processing apparatus 1500, a processing for enhancing the higher frequency components in accordance with the density is applied to the SWTF characteristic (FIG. 7($d1$)). As the result of that, image display is performed also by the image display apparatus D with the same characteristic as the recording characteristic of the image recording apparatus A to C (FIG. 7($d3$)).

Besides, in the above-mentioned cases, actually it is difficult to reflect the characteristic of an original image over the whole spatial frequency range in some cases; however, because the information of a radiographic object which is important to image diagnosis is mostly contained in the spatial frequency components not higher than 3.0 cycles/mm, it is sufficient that the spatial frequency components not higher than 3.0 cycles/mm can be faithfully reflected. That is, it is desirable that the frequency response characteristic of each of the apparatus is approximately 1 (0.95 to 1.05) for spatial frequencies not higher than 3.0 cycles/mm as "the corrected" shown in FIG. 7($a3$) to FIG. 7($d3$).

Further, also it is appropriate to make this invention have a structure such that a frequency enhancement processing which is changed in accordance with the kind of the input apparatus of the image to be recorded or the part of the radiographic object is carried out. For example, as regards an image of mammography, because the original image information contains a lot of high frequency components, it is desirable to apply to it a processing of a particularly strong degree of enhancement, or to enhance more the high frequency components. Further, also it is appropriate to carry out a frequency enhancement processing which is changed in accordance with the difference whether the image input apparatus is an X-ray CT apparatus or a CR apparatus.

Further, it is desirable that an image recording apparatus of this invention comprises a storage means for storing the different conditions of frequency enhancement processing in correspondence to the kinds of the image input apparatus or the parts of the radiographic object, and practices image processing on the basis of the stored correspondence relationship. For example, with the different function types of the enhancement coefficient β in the above-mentioned unsharp mask processing denoted by β1, β2, β3, and β4, it is appropriate to store such a table as shown in Table 3.

TABLE 3

| Kind of input apparatus | Part of radiographic object | Function type of β |
|---|---|---|
| X-ray CT | All parts | β1 |
| MRI | All parts | β2 |
| CR | Mamma | β3 |
|  | Other part than mamma | β4 |

As regards the method of identifying the kind of an image input apparatus, for example, a case where the identification is carried out on the basis of the header information attached to an image signal can be considered.

Further, as regards the method of identifying the part of a radiographic object, for example, it can be considered a case where the identification is carried out on the basis of the pattern recognition of an image (such as pattern matching), or a case where the identification is carried out on the basis of the header information attached to an image signal.

Further, as regards the method of identifying the part of a radiographic object, also it is possible to identify the part by abstracting the edges which are contained in the image. To take a radiographic object consisting of bones of limbs such as an image of the leg part for instance, edges which have a comparatively high strength and have components in the direction perpendicular to the border lines are present continuously along the border lines of bones. Such a continuous edge in the same direction appears not only in the limb bones but also in the contour of the lung or in the contour of a maxillary bone in the same way. Further, as a lumber image, in the case where the backbone is the main radiographic object, because the backbone is the assembly of small bones, edges having a high strength are concentrated in the backbone part, but the direction of those edges are in the state of no unification. In this way, also by the pattern of edges, information which is effective for the recognition of the part of a radiographic object can be obtained.

As explained in the foregoing on the basis of examples of the embodiment, it is possible to provide an image recording apparatus and a medical-use image recording apparatus which are capable of recording an image having no blur and a high diagnosis capability by a simple method. Further, it is possible to actualize a medical-use imaging system which is capable of providing an image having a stable image quality not influenced by the change of the density of an image to be recorded, and the change of the image recording apparatus and/or the image display apparatus.

What is claimed is:

1. An image recording method for visualizing an image signal of medical diagnosis, comprising:
   inputting the image signal of medical diagnosis;
   processing the image signal of medical diagnosis to get correct sharpness in visualized image by applying a frequency enhancement processing; and
   visualizing the image signal of medical diagnosis by conducting an ink-jetting process to form an image on a recording medium based on a processed image signal, wherein the ink-jetting process has a characteristic such that sharpness of a visualized image becomes lower according to a density of the visualized image becoming higher;
   wherein degree of enhancement in the frequency enhancement processing is made higher according to a density of visualized image becoming higher, and
   wherein degree of enhancement in the frequency enhancement processing is changed in accordance with a kind of the recording medium.

2. The image recording method of claim 1, wherein the frequency enhancement processing is applied in accordance with a kind of the ink.

3. The image recording method of claim 1, wherein the frequency enhancement processing is applied in accordance with a kind of a recording medium, and with a kind of the ink.

4. An image recording apparatus for visualizing an image signal of medical diagnosis, comprising:
   an image signal input device for inputting the image signal of medical diagnosis;
   an image processing device for applying a frequency enhancement processing to an inputted image signal of medical diagnosis to get corrected sharpness in visualized image;
   a recording device for visualizing the image signal of medical diagnosis by jetting ink onto a recording medium based on a processed image signal, wherein the recording device has a characteristic such that sharpness of a visualized image becomes lower according to a density of the visualized image becoming higher; and
   a controller for controlling degree of enhancement in frequency enhancement processing according to a density of visualized image, wherein the degree of enhancement is made higher according to a density of visualized image becoming higher.

5. The image recording apparatus of claim 4, wherein degree of enhancement in the frequency enhancement processing is changed in accordance with a kind of the recording medium.

6. The image recording apparatus of claim 4, wherein the frequency enhancement processing is applied in accordance with a kind of the ink.

7. The image recording apparatus of claim 4, wherein the frequency enhancement processing is applied in accordance with a kind of a recording medium, and with a kind of the ink.

8. A image recording system for visualizing an image for medical diagnosis, comprising:
   an image input device for inputting an image signal;
   a plurality of image output devices for forming a visible image based on a transmitted image signal, wherein some of the plurality of image output devices have a different frequency response with each other;
   an image processing device for applying a frequency enhancement processing, which corresponds to a frequency characteristic of each of the plurality of image output device, onto the image signal inputted through the image input device, to form a plurality of processed image data; and a controller for controlling the image input device, the image processing device, and the plurality of image output device, wherein the image processing device applies the image processing, which is correspondent to each of the plurality of image output device, onto the image signal, inputted through the image input devise so that approximately constant qualities of visible images are obtained regardless of characteristics of the plurality of the output devices.

9. An image recording system for visualizing an image of medical diagnosis, comprising:

an image input device for inputting an image signal;

a plurality of image output devices for forming a visible image based on a transmitted image signal, wherein some of the plurality of image output devices has a different frequency response with each other;

an image processing device for applying a frequency enhancement processing, which corresponds to a frequency characteristic of each of the plurality of image output device, onto the image signal inputted through the image input device, to form a plurality of processed image data;

a memory device for storing a plurality of the processed image data; and a controller for controlling the image recording system, wherein the image input device, the plurality of image output device, the image processing device, and the memory device are connected to a network, wherein the controller retrieves and transmits the processed image data, which corresponds to a designated output device out of the plurality of image output devices, to form the visible image based on the transmitted image data by the designated output device.

10. The image recording system of claim 9, wherein the plurality of image output devices comprise at least on inkjet image output device.

11. The image recording system of claim 9, wherein the plurality of image output devices comprise at least one image recording device, which records an image on a recording medium, and one image viewer.

12. An image recording system for visualizing an image of medical diagnosis, comprising:

an image input device for inputting the image signal of medical diagnosis;

a plurality of image output devices for forming a visible image based on the image signal, wherein some of the plurality of image output devices has a different frequency response with each other;

a designation device for designating a specific image output device out of the plurality of image output devices;

an image processing device for applying a frequency enhancement processing, which corresponds to a frequency response of the specific image output device, onto the image signal inputted through the image input device, to form a processed image data; and a controller for controlling the image recording system, wherein the image input device, the plurality of image output devices, the image processing device, and the designation device are connected to a network, wherein the specific image output device forms a visible image based on the processed image data.

13. The image recording system of claim 12, wherein the plurality of image output devices comprise different methods of image output devices.

14. The image recording system of claim 12, wherein the plurality of image output devices comprise at least one image recording device, which records an image on a medium, and one image viewer.

15. The image recording system of claim 12, wherein the plurality of image output devices comprise at least one inkjet image output devices.

16. The image recording system of claim 15, wherein the inkjet image output device employs plural inks of different densities and/or plural kinds of recording media.

17. An image recording system for visualizing an image of medical diagnosis, comprising:

a plurality of image input devices for inputting the image signal of medical diagnosis;

a plurality of image output devices for forming a visible image based on the image signal, wherein some of the plurality of image output devices has a different frequency response with each other;

a designation device for designating a specific image output device out of the plurality of image output devices;

an image processing device for applying a frequency enhancement processing, which corresponds to a frequency response of the specific image output device, onto the image signal inputted through the image input device, to form a processed image data;

a controller for controlling the image recording system, wherein the plurality of image input devices, the plurality of image output devices, the image processing device, and the designation device are connected to a network, wherein the specific image output device forms a visible image based on the processed image data.

18. An image recording system for visualizing an image of medical diagnosis, comprising:

a plurality of image input devices for inputting the image signal of medical diagnosis;

a plurality of image output devices for forming a visible image based on the image signal, wherein some of the plurality of image output devices has a different frequency response with each other;

a designation device for designating a specific image output device out of the plurality of image output devices;

an image processing device for applying a frequency enhancement processing, which corresponds to a type of image input device through which the image signal is inputted and a frequency response of the specific image output device, onto the image signal inputted through the image input device, to form a processed image data;

a controller for controlling the image recording system, wherein the plurality of image input devices, the plurality of image output devices, the image processing device, and the designation device are connected to a network, wherein the specific image output device forms a visible image based on the processed image data.

* * * * *